Jan. 5, 1965                B. BRIGHTMAN                3,164,678
        ELECTRONIC SWITCHING SYSTEM HAVING A DATA REGISTER
                  INCLUDING CIRCULATING MEMORY MEANS
Filed Feb. 27, 1961                              9 Sheets-Sheet 1
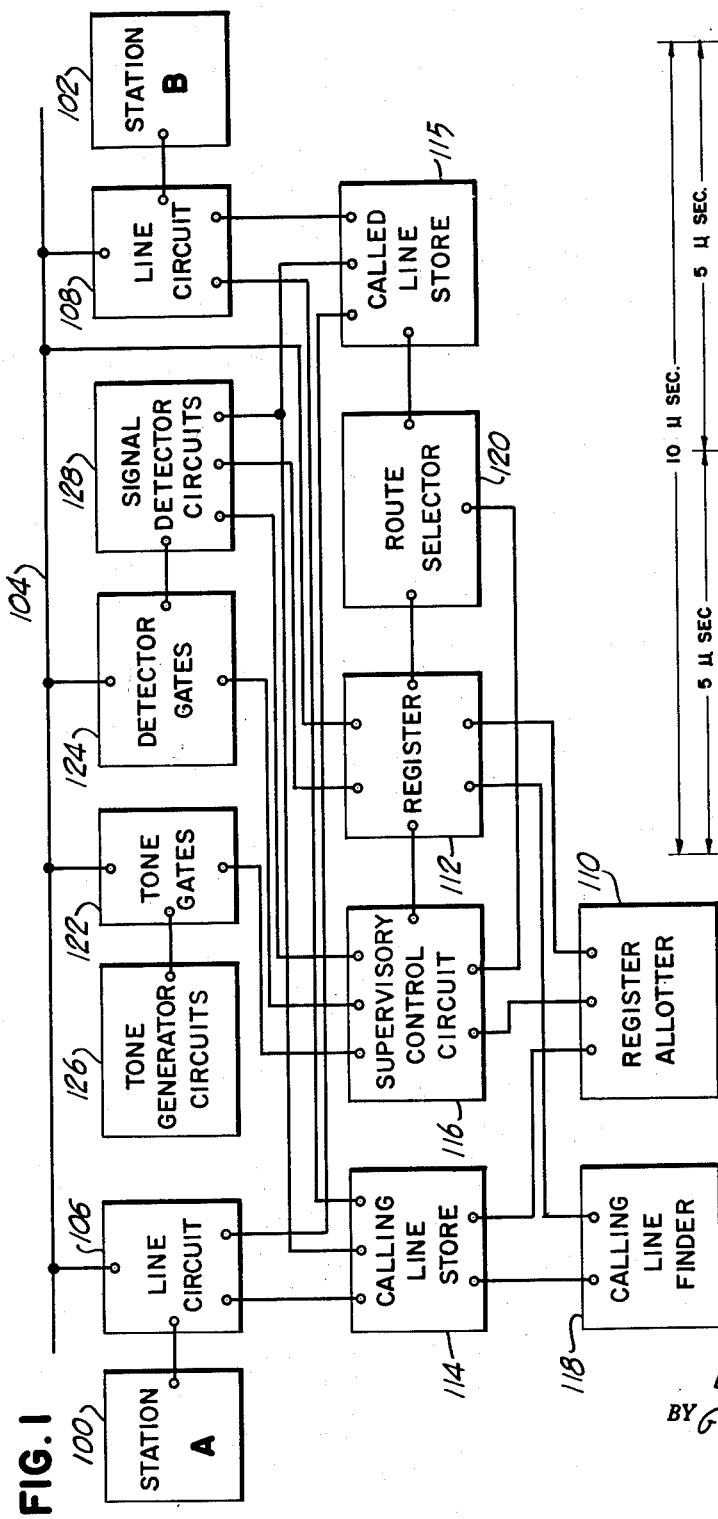
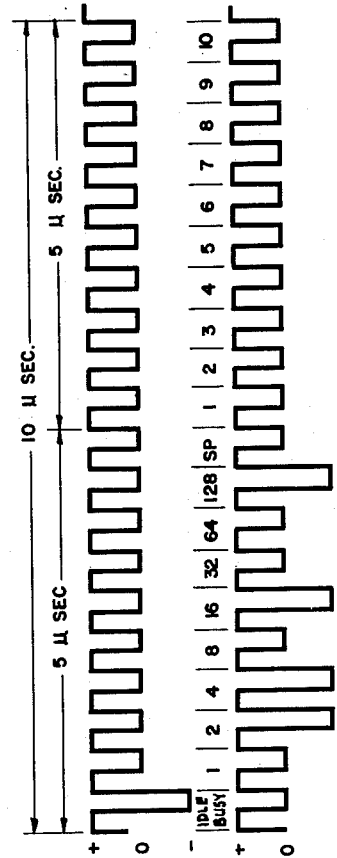
FIG.1
FIG.17A
FIG.17B
INVENTOR.
BARRIE BRIGHTMAN
BY George J. Seligsohn
ATTORNEY

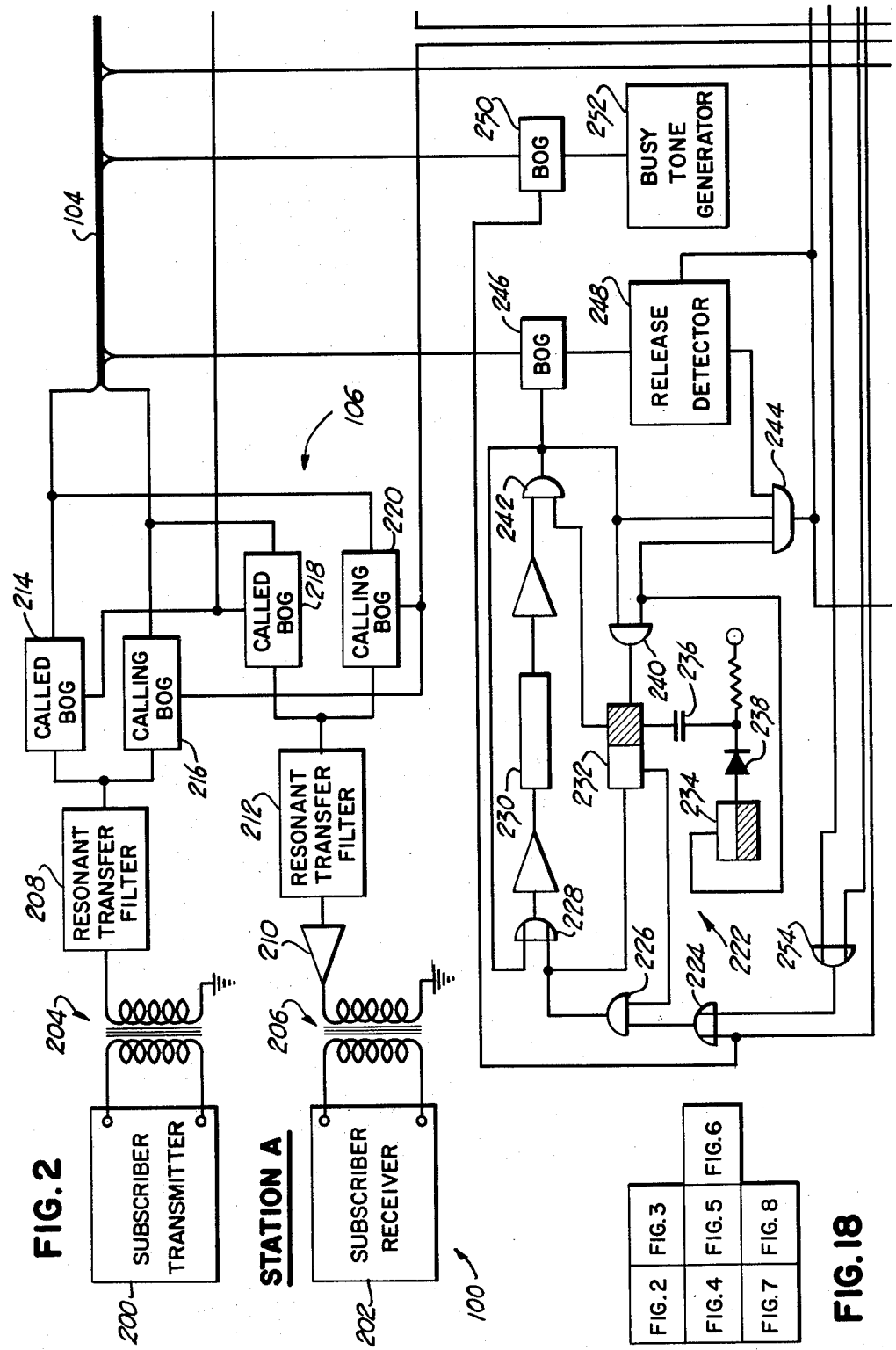

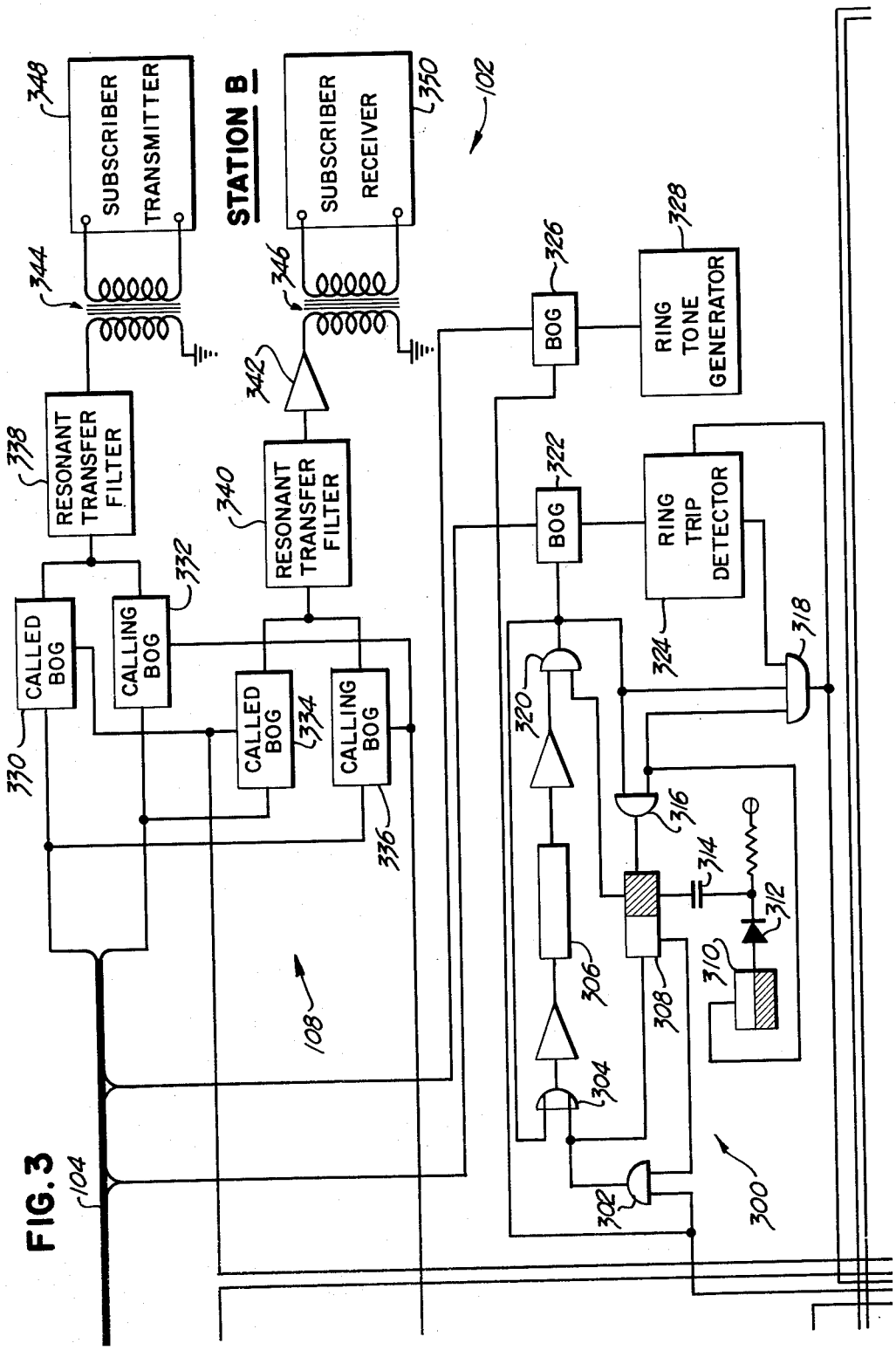

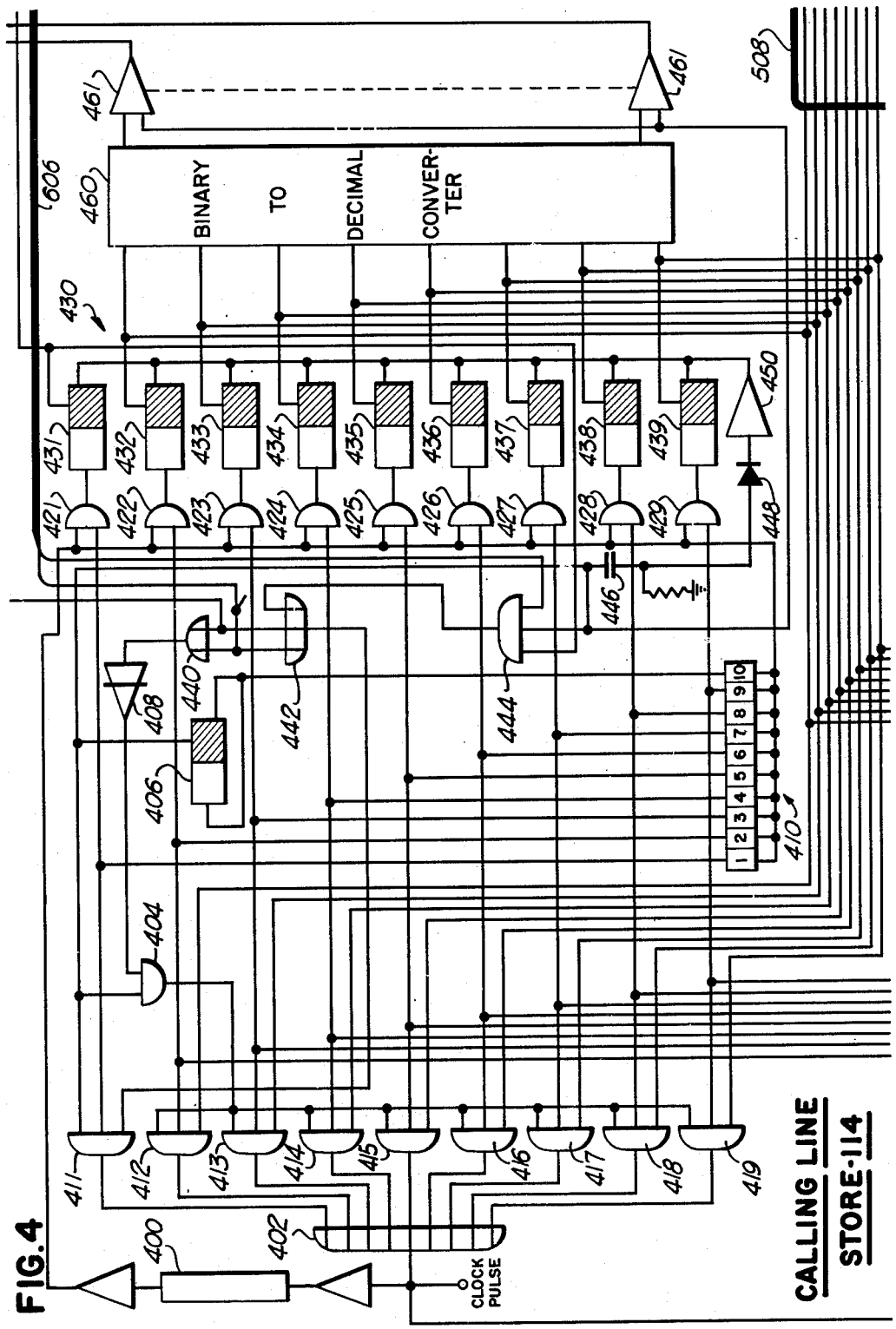

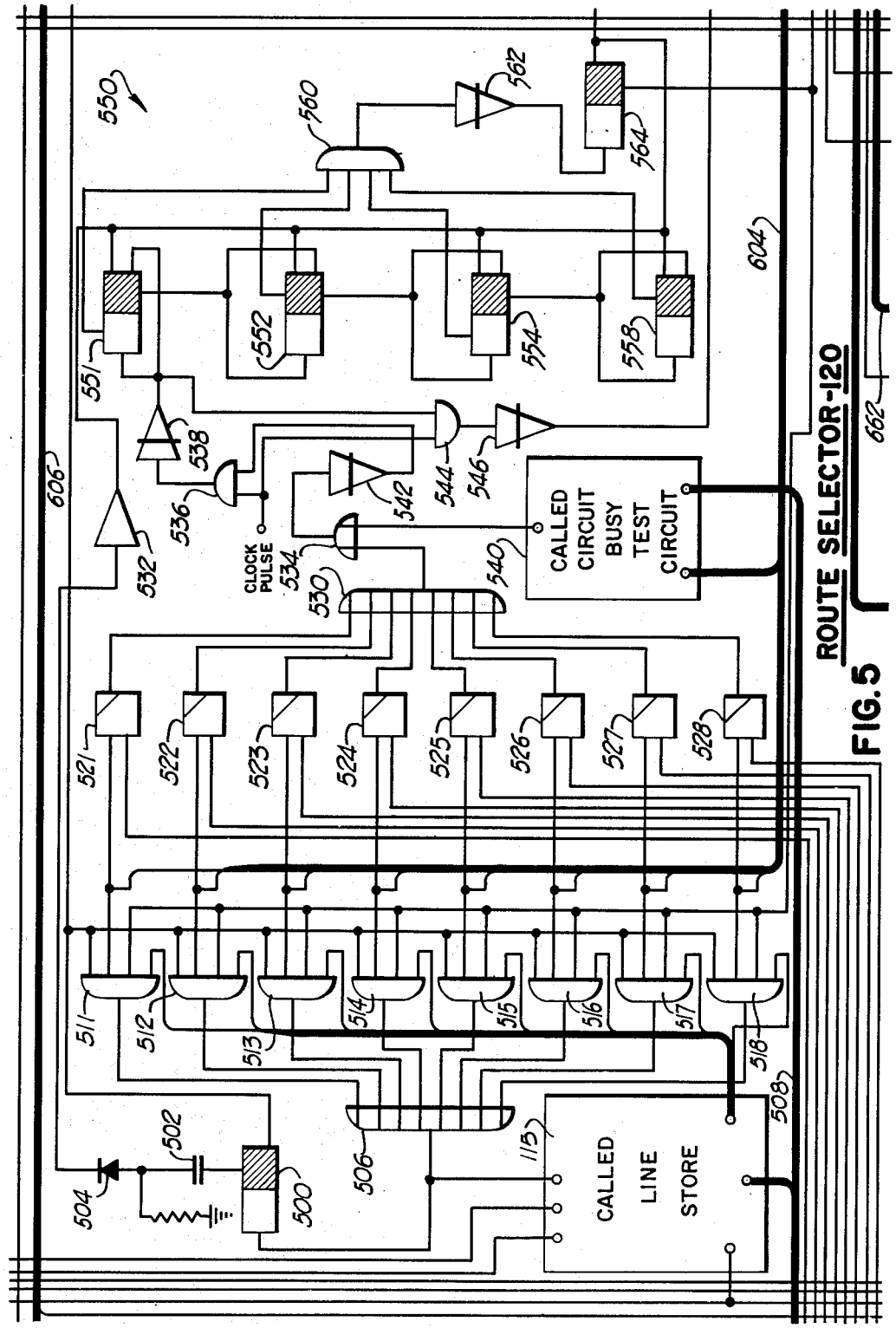

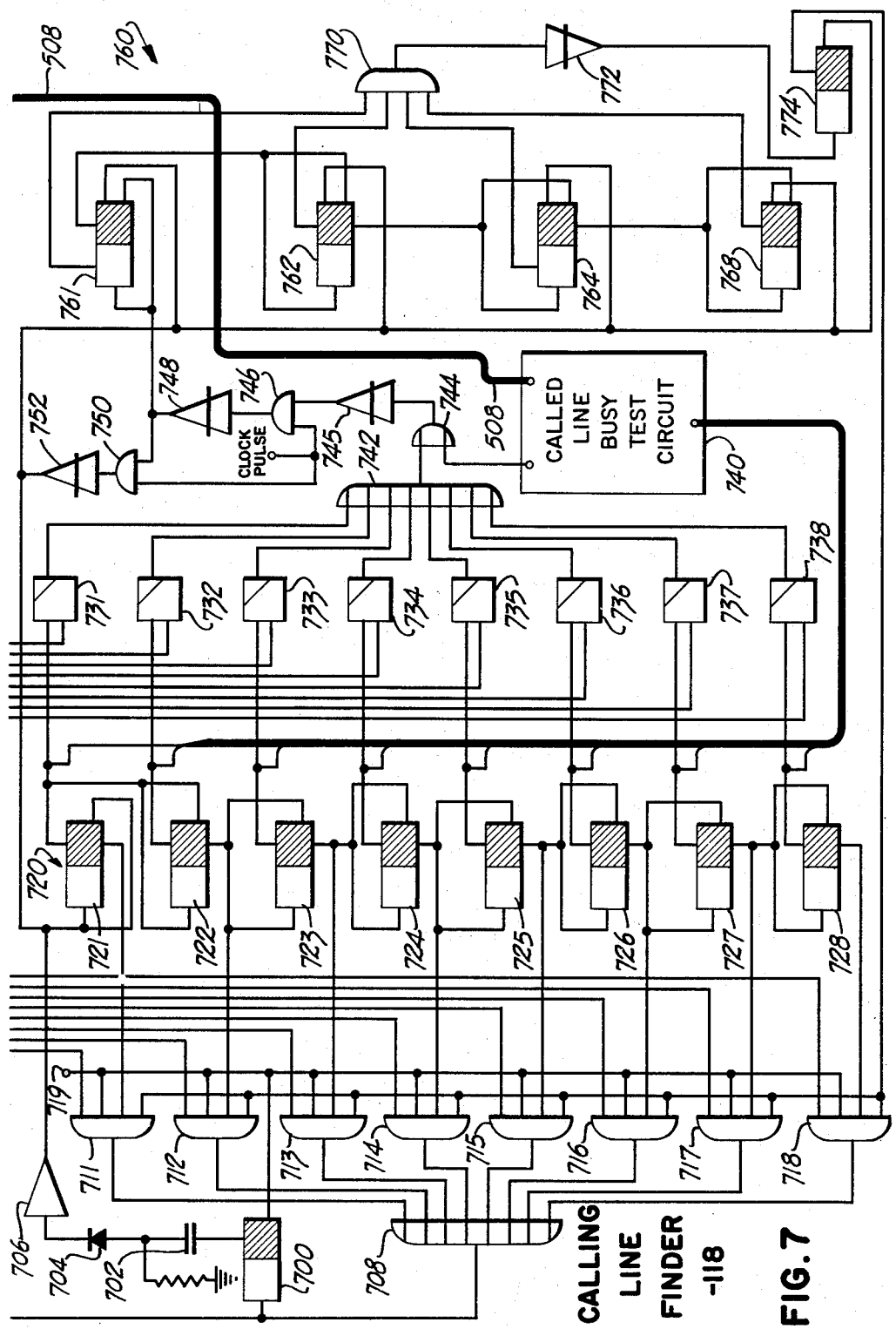

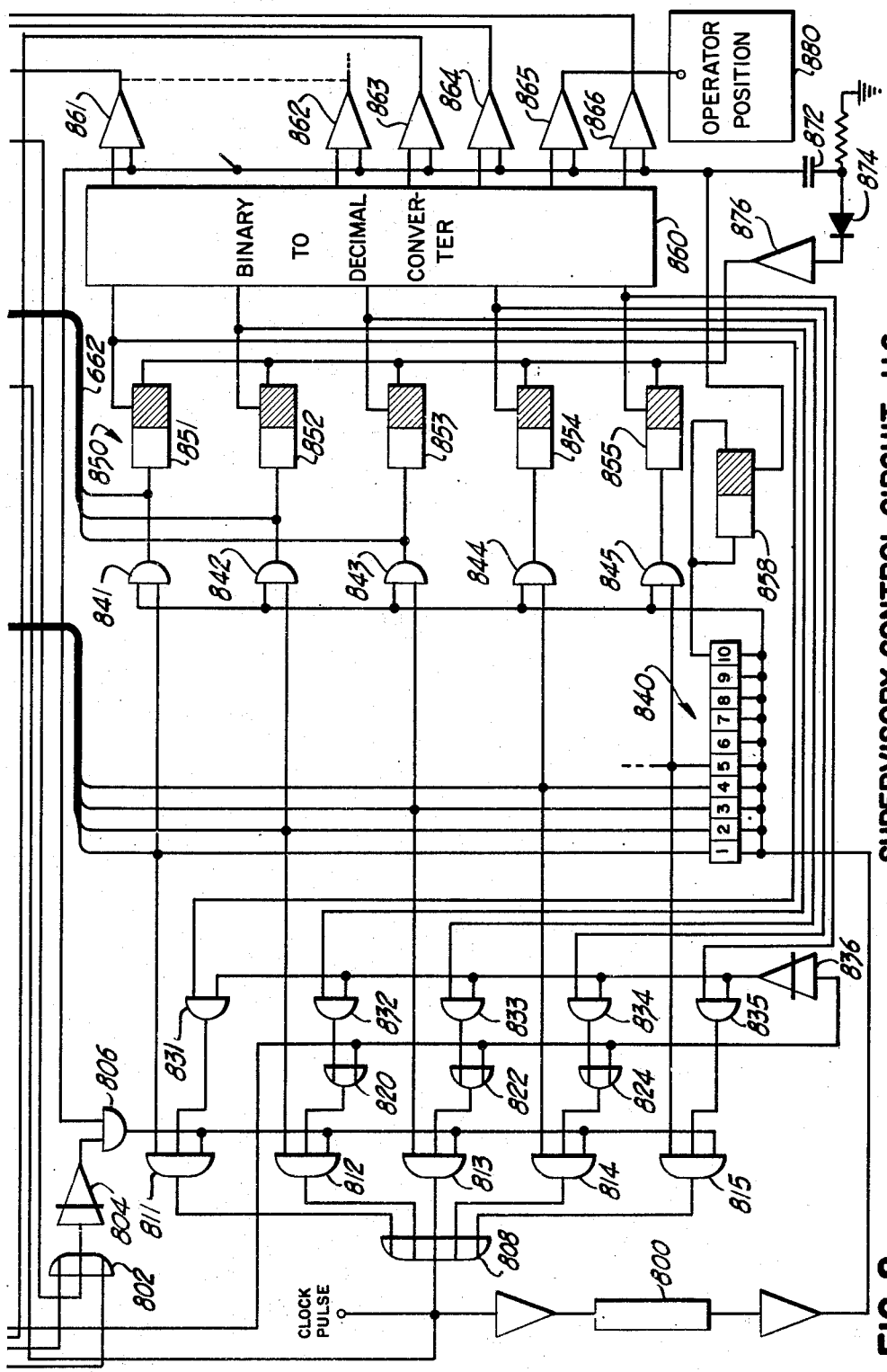

FIG. 9A
"AND" GATE
FIG. 9B
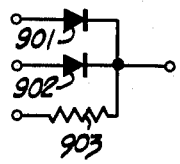
FIG. 10A
"OR" GATE
FIG. 10B
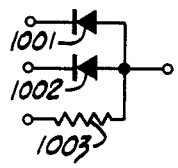
FIG. 11A
PULSE INVERTER
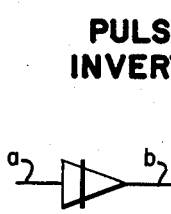
FIG. 11B
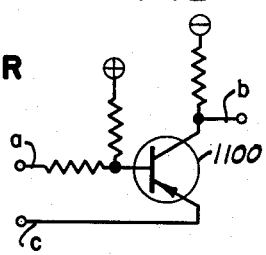
FIG. 12A
EMITTER FOLLOWER
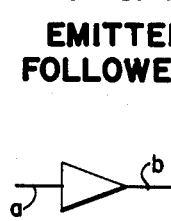
FIG. 12B
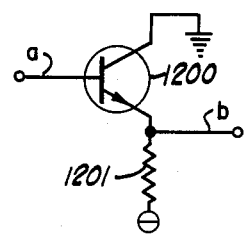
FIG. 13A
FLIP-FLOP
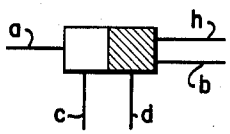
FIG. 13B
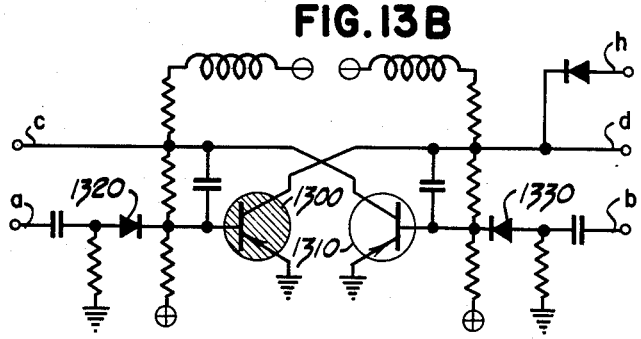
FIG. 14
DELAY LINE
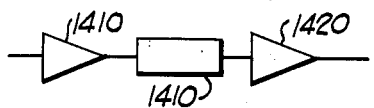
FIG. 15A
HALF ADDER
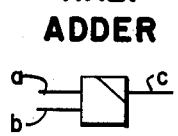
FIG. 15B
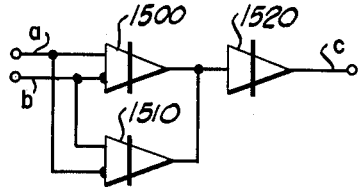
FIG. 16A
MONOSTABLE MULTIVIBRATOR
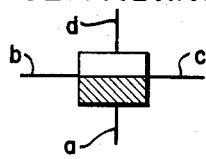
FIG. 16B
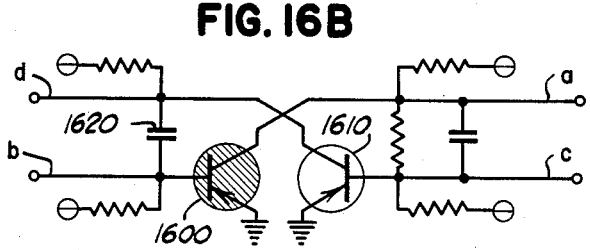

United States Patent Office 3,164,678
Patented Jan. 5, 1965

3,164,678
ELECTRONIC SWITCHING SYSTEM HAVING A DATA REGISTER INCLUDING CIRCULATING MEMORY MEANS
Barrie Brightman, Webster, N.Y., assignor to General Dynamics Corporation, Rochester, N.Y., a corporation of Delaware
Filed Feb. 27, 1961, Ser. No. 92,050
1 Claim. (Cl. 179—15)

This invention relates to an automatic communication system and, more particularly, to a new and improved time division multiplex switching system.

In the prior time division multiplex system shown in the copending application of Barrie Brightman, Serial No. 45,342, filed July 26, 1960, the amount of common equipment used for intermediate data storage and for controlling the extension of a communication path between a group of circuits has been materially reduced with an attendant reduction in the cost and physical size of the system. In this prior system, digital data relating to a call, such as the designation of the calling line, is stored as a parallel code entry in a plurality of delay lines in a distinct time slot or position assigned to the path to be extended. While this use of delay lines materially reduces the amount of data or digit storage equipment required in the system, signal circulating data storing means can be used in other ways to further reduce the size and cost of an electronic switching system without reducing the functions that can be performed thereby.

Accordingly, one object of the present invention is to provide a new and improved automatic communication system.

Another object is to provide a new and improved time division multiplex switching system.

Another object is to provide an electronic switching system including new and improved means for storing digital data in a signal circulating register.

A further object is to provide an electronic switching system having a data register including both delay means and static storage means through which signals, such as line designations, are circulated during each time frame.

Another object is to provide an electronic switching system having a data register including both signal circulating means for circulating a data entry for a portion of a time frame and a register for storing the designation in static form during the remainder of the time frame.

Another object is to provide an electronic communication system in which different digital signals directing successive steps in establishing a communication path are sequentially stored in and circulated through signal register means to control the establishment of the path.

Another object is to provide an electronic communication system in which different digital signals directing the successive steps used in establishing a communication path are circulated in different time slots of a delay means so that the delay means is capable of concurrently controlling the establishment of a plurality of different communication paths even though the different paths are in different states of completion.

Another object is to provide an electronic communication system including new and improved means for controlling the application of supervisory signals to communication circuits.

A further object is to provide an electronic communication system including new and improved means for controlling the connection of signal detectors to communication circuits.

A further object is to provide new and improved means for storing data in and recovering data from a signal circulating means.

Another object is to provide a data register including delay means and a plurality of bistable circuits for storing a data entry in dynamic and static form.

In accordance with these and many other objects, a system embodying the invention includes a plurality of communication circuits that can be connected to a common signal transmission channel or highway through a plurality of signal responsive gates. These gates are opened and closed at distinct time positions in a repetitive time frame under the control of signals supplied thereto from a calling line store and a called line store in which are circulated, in serial coded form, the designations of the calling and called lines. Each of the time frames is divided into a plurality of distinct time slots or positions, and each of these time positions is divided into a first data storing portion and a second synchronizing portion. The first or data storing portion stores both a signal indicating the idle or busy condition of the time slot and a group of other signals interspersed with synchronizing signals providing a coded representation of a calling or called line designation.

The calling and called line stores each include a delay line whose input and output are connected to a plurality of bistable circuits. A counting circuit controlled by the interspersed synchronizing signals appearing at the output of the delay line during the first portion of each time slot renders the bistable circuits responsive in sequence to the idle-busy and designation representing signals appearing at the output of the delay line. In this manner, the bistable circuits are set under the control of the idle-busy signal and the coded representation of the line designation to store this information in static form. During the second or synchronizing portion of each time slot a signal is supplied in the assigned time slot to the two line gates selected by the stored representations so that a path is completed over the highway between the calling and called lines. The counting circuit is also operated by the synchronizing signals during the second portion of each time slot to control the transfer of the data stored in the bistable circuits to the input of the delay line for recirculation. Thus, the data in the calling and called line stores is stored in both dynamic and static form during each time frame.

The system also includes an additional delay line whose input and output are connected to a plurality of bistable circuits. This delay line, which can be divided into the same time positions as the delay lines provided in the calling and called line stores, is provided with different digital designations in different ones of the time slots in accordance with the different operational steps to be performed in establishing one or more communication paths. These different digital command signals are continuously circulated in the proper time slots in the supervisory delay line until the directed operational step has been performed, and then this digital designation is erased and another digital designation is inserted representing the next step to be performed in establishing the communication path. In this manner, a single delay line is successively provided with different digital designations in different time slots for directing and controlling the establishment of different communication paths. This delay line can store such digital command messages as one selecting a register to be used in establishing the connection, one directing the return of busy tone to the calling line, one directing the application of busy tone or ring tone to the common communication highway or one requesting the connection of various signal detectors, such as a release signal detector, to this highway.

Many other objects and advantages of the present invention will become apparent from the following detailed description when considered in conjunction with the drawings in which:

FIG. 1 is a block diagram of an automatic communication system embodying the present invention;

FIGS. 2–8 form a logic diagram of the system shown in FIG. 1;

FIGS. 9–16 illustrate logic symbols and typical circuits of different circuit components used in the logic diagram of FIGS. 2–8;

FIG. 17 is a timing diagram illustrating certain signals used in the system of the present invention; and FIG. 18 is a block diagram illustrating the manner in which FIGS. 2–8 of the drawings are positioned adjacent each other to form a complete logic diagram of the system.

Figure 6:
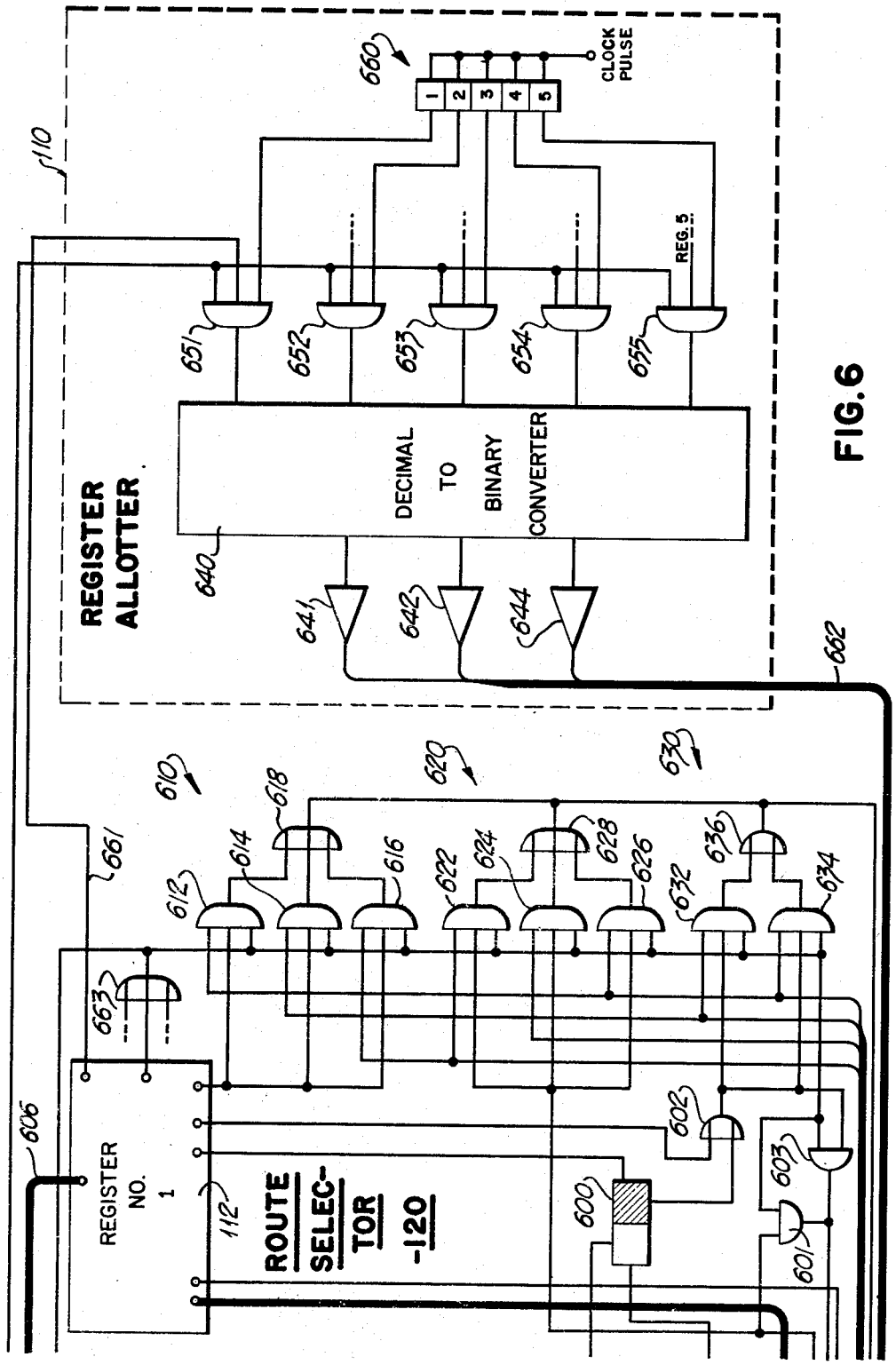

FIG. 1 of the drawings comprises a block diagram of an automatic communication system that embodies the present invention. In the detailed logic diagram of FIGS. 2–8, this system is shown as including up to 256 line or trunk circuits, but it is obvious that the switching capacity of the system can be increased merely by duplicating certain items of common equipment and increasing the digital storage capacity of certain other components in the system. The communication system uses a time division multiplex technique for establishing coexisting communication paths on a single transmission channel under the control of tone frequency sngals supplied from the line and trunk circuits. However, it is manifest that the system is also capable of use with controlling or directive signals comprising pulses or groups of pulses.

In general, all of the switching operations of the system are synchronized by a clock pulse source providing signals at 4 megacycles and selected submultiples thereof. In order to proivde ten separate time positions or slots in the common channel or highway over which the line and trunk circuits can be interconnected, a frame rate of 10 kc. having a duration of one hundred microseconds is selected. Each of the ten time slots has a duration of ten microseconds that is equally divided into two portions of five microseconds duration (FIG. 17). Each of these two portions is divided into ten equal intervals of .5 microsecond which each comprise a .25 microsecond synchronizing pulse and a .25 microsecond interval that is available for storing data pulses. The synchronizing pulses and the data pulses are provided or synchronized by the 4 megacycle clock pulse source. The first five microsecond portion of each time slot is used to store up to ten data bits each separated by a synchronizing signal and the second five microsecond portion of each time slot consists of only synchronizing pulses.

Referring now more specifically to FIG. 1 of the drawings, the automatic electronic communication system shown therein includes a plurality of subscriber stations 100 or 102 that are connected to a common highway or transmission channel 104 by a pair of line circuits 106 and 108. The line circuits 106 and 108 are supplied with signals in an assigned one of the ten time slots to connect the associated stations 100 and 102 over the common highway 104 to permit communication between the circuits 100 and 102 in the assigned time slot. Any time slot can be assigned for use to any pair of more of the line circuits 106 and 108.

During operation, a register allotter 110 is provided with a busy-free marking signal from each of a plurality of registers, such as a register 112, that indicates the idle or busy condition of each of the registers. The register allotter 110 also receives signals from a calling line store 114 that indicate the idle or busy condition of the ten time slots. When the register allotter 110 receives concurrent signals indicating an idle time slot and a free register, a digital designation identifying the free register is transferred to a supervisory control circuit 116 and the idle time slot is transferred to and stored in the selected register 112. This removes the free or idle marking from the register alloter 110 identifying the selected register 112 and connects a signal detector in the seized register 112 to the highway 104 in the assigned time slot to look for a signal in this time slot representing a calling circuit. A signal is also forwarded to the store 114 to mark the assigned time slot as busy by changing the idle-busy marking in the first portion of the assigned time slot.

A calling line finder 118 includes a counter operable to successive settings representing the binary coded designation of each of the line circuits 106 and 108 or of the stations 100 and 102. The calling line finder 118 compares the setting of this counter with the calling line designations stored in the calling line store 114 and the called line designation stored in a called line store 115 to determine the idle or busy condition of the line represented by the present setting of the calling line counter.

When a line is found to be idle for a one full time frame, the calling line finder 118 transfers the idle line designation from the counter to the calling line store 114 in the time slot assigned to the seized register 112, and this designation is stored or circulated in the calling line store 114.

The store 114 includes a single delay line having a delay interval that is one half of one time slot shorter than the duration of one full time frame, and the input of this delay line is connected to the calling line finder 118. A counting circuit in the calling line store 114 controls the serial transmission of binary code bits from the calling line counter in the line finder 118 to the delay line in the calling line store 114. These code bits are stored in the first portion of the seized time slot together with the idle-busy signal, and this information passes along the delay line. The calling line store 114 also includes a plurality of bistable circuits connected to the output of the delay line for converting the dynamically stored idle-busy signal and calling line designation to a static form once during each time frame. The data bits in this information are applied to the bistable circuits in sequence under the control of a counting circuit operated by the synchronizing signals supplied at the output of the delay line.

While stored in this static form, the binary coded calling line designation is converted into a gating pulse occupying the second portion of the time slot, and this pulse is forwarded to a selected one of the line circuits, such as the circuit 106, in accordance with the value of the stored calling line designation. Concurrently therewith, the counting circuit in the calling line store 114 is operated by the synchronizing pulses from the output of the delay line in the second portion of the assigned time slot to control the return of the stored designation from the bistable circuits to the input of the delay line. Since this operation requires a period of one half of one time slot, the closed loop provided by the delay line and the bistable circuits provides a full time frame delay during which the stored designation is circulated through the calling line store 114 partially in dynamic form and partially in static form. The continuous circulation of this information through the delay line and bistable circuits serves to connect the station 100 to the highway 104 once during each time frame.

When the line circuit 106 responds to the gating pulse by connecting the station 100 to the highway 104 in the assigned time slot, the multifrequency detector circuit in the register 112 examines the highway 104 for the presence of a seize signal indicating a calling condition at the station 100. If a seize signal does not appear during the recognition interval of the detector in the register 112, this register clears the calling line store 114, inserts an idle signal in the first portion of the released time slot in the calling time store 114, and forwards a free mark to the register allotter 110 to permit a reassignment of the register 112. Alternatively, if a seize signal is received from the station 100 indicating that the line 106 is in a calling condition, the register 112 returns dial tone over the highway 104 to the calling station 100 to advise the subscriber that the designation of the called line can be transmitted. The register 112 receives the multifrequency signals representing the designation of the called circuit and stores these signals for subsequent use.

When the complete called line designation has been received from the calling station 100, this designation is forwarded in binary coded form to a route selector 120 in which the designation of the called line is compared with the line designations stored in the calling line store 114 and the called line store 115 to determine the idle or busy condition of the called line. If the called line is in a busy condition, the route selector 120 erases the designation of the register 112 from the delay line in the supervisory control circuit 116 and inserts a different digital designation in this delay line in the same time slot to indicate that the called line is not available. This digital designation continuously circulates in the delay line in the control circuit 116 and forwards an enabling signal to a selected one of a number of tone gates 122 and a selected one of a number of detector gates 124. The selected tone gate 122 connects a busy tone generator in a group of tone generator circuits 126 to the highway 104 in the assigned tme slot to indicate to the calling station 100 that the called line is not available. The signal forwarded to the selected detector gate 124 connects a release detector in a group of signal detector circuits 128 to the highway 104 in the assigned time slot so that when the calling station 100 returns to a normal condition, the release detector detects the presence of the release tone and resets the calling line store 114 and the supervisory control circuit 116 to a normal condition.

Alternatively, when the called line is idle, the route selector 120 forwards the binary designation of the called line for storage in the called line store 115. The called line store 115 is substantially identical to the calling line store 114 and stores the called line designation in dynamic and static form in a delay line and a plurality of bistable circuits. The storage of a called line designation in the store 115 controls this store to provide a gating pulse in the assigned time slot to the called one of the line circuits, such as the circuit 108. This connects the station 102 to the highway 104 in the same time position as the station 100.

In addition, the route selector 120 returns a signal to the supervisory control circuit 116 erasing the digital designation in the assigned time slot representing the register 112 and inserts a different digital designation representing the fact that ring tone is to be supplied to the called line. This digital designation now continuously circulates in the delay line in the supervisory control circuit and is translated into a pulse in the assigned time slot that is forwarded to the tone gates 122 and the detector gates 124. The selected tone gate 122 enables a selected tone generator 126 to apply ring tone to the highway 104 in the assigned time slot so that the called station, such as the station 102, receives ring tone. The signal supplied to the selected detector gate 124 connects a ring trip detector in the detector circuits 128 to the highway 104 in the assigned time slot so that a signal indicating that the call has been answered at the called station 102 can be detected.

When this signal is detected, the signal detector circuits 128 return a signal to the supervisory control circuit 116 to erase the previous digital designation from the delay line therein and to insert a different digital designation representing the completion of the call. This designation is now circulated in the delay line in the supervisory control circuit 116 in the assigned time slot and provides a control signal to the detector gates 124 so that the release detector in the signal detector circuits 128 continuously monitors the common highway 104 for a release tone. When the completed communication path is released at the termination of the conversation, the detection of the release tone by the signal detector circuits 128 forwards a signal to the calling line store 114, the supervisory control circuit 116, and the called line store line 115 to erase the information previously stored therein in the assigned time slot. This signal also inserts an idle signal in the first portion of the time slot in the calling line store 114 and the called line store 115 to indicate that this time slot is now available for use.

LOGIC SYMBOLS AND TYPICAL CIRCUITS

The details of the communication system shown in block form in FIG. 1 are illustrated in FIGS. 2–8 of the drawings by the use of a logic diagram in which various circuit components are shown in logic schematic form. In the logic diagram, each circuit component, such as an inverter or gate, is represented by a particular logic symbol. The logic symbols together with typical circuit arrangements represented by the symbols are illustrated in FIGS. 9–16 of the drawings. These figures usually include both an illustration of the logic symbol and a circuit diagram of a typical circuit represented by the symbol. Although the illustrated representative circuits are conventional in design and well known in the art, a brief description of each of these circuits is set forth below.

*"AND" Gate*

The logic symbol for an "AND" gate is illustrated in FIG. 9A, and a typical circuit represented by this symbol is shown in FIG. 9B. As illustrated, the "AND" gate includes a plurality of diodes 901 and 902, the cathodes of which are connected together and to a common output terminal. The anodes of the diodes 901 and 902 provide individual diode inputs to the gate circuit. A resistor 903 connected to the output terminal provides a resistive input for the gate circuit. The "AND" gate shown in FIG. 9A provides an "AND" function for negative signals. That is, with the resistor 903 connected to a negative potential, the output of the gate will drop to a negative potential only when all of the input terminals are also returned to a negative potential. The output terminal will rise to a more positive or ground potential when any one or more of the input terminals is returned to a more positive or ground potential.

*"OR" Gate*

The logic symbol for an "OR" gate is shown in FIG. 10A, and a typical circuit represented by this symbol is illustrated in FIG. 10B. The "OR" gate includes a plurality of diodes, such as a pair of diodes 1001 and 1002, whose anodes are connected together to provide an output terminal. The cathodes of the diodes 1001 and 1002 provide individual inputs to the gate. A resistor 1003 connected to the common output terminal provides a resistance input for the gate. The "OR" gate shown in FIG. 10A provides an "OR" function for negative potentials. When the resistor 1003 is connected to ground or a relatively positive potential, the output of the gate will drop to a negative potential when the anode of one of the diodes 1001 or 1002 is returned to a more negative potential.

*Pulse Inverter*

The logic symbol for one pulse inverter is shown in FIG. 11A of the drawings, and a typical circuit represented by this logic symbol is shown in FIG. 11B. The inverter comprises a transistor 1100 having its base electrode connected to an input terminal "a" and its collector electrode connected to an output terminal "b." The emitter electrode of the transistor 1100 is normally connected directly to ground at a terminal "c" which is not shown in the logic symbol illustrated in FIG. 11A. However, in the circuit shown in FIG. 15B, a switched ground is applied to the emitter electrode of the transistor 1100 to provide a gated inverter. In this figure, the logic symbol for the inverter is modified to show the connection to the terminal "c" by a line terminating in a dot adjacent the base of the triangular outline used as a logic symbol for the pulse inverter. The output of the transistor 1100 normally supplies a negative potential. However, when the base electrode is driven sufficiently negative, the tarnsistor 1100 conducts to elevate the potential at the terminal "b" toward ground.

Emitter Follower

The logic symbol for an emitter follower using positive-going signals is illustrated in FIG. 12A, and a typical circuit represented by this symbol is shown in FIG. 12B. The emitter follower includes a transistor 1200 having its collector electrode connected directly to ground and its emitter electrode connected to a negative potential through a resistance element 1201. When a positive-going signal is applied to an input terminal "a," the base of the transistor 1200 is driven in a positive direction so that the transistor 1200 conducts more heavily. This causes the normally negative potential supplied to an output terminal "b" to rise toward ground and thus reproduces the positive-going pulse supplied to the input terminal "a."

Flip-Flop

The logic symbol for a flip-flop is shown in FIG. 13A, and a typical circuit represented by this symbol is illustrated in FIG. 13B. This flip-flop, which includes a pair of transistors 1300 and 1310, is used to provide steady state marking potentials in the control circuits and, by strapping a pair of input terminals "a" and "b" together, can be used as a binary counting stage responsive to positive-going pulses. Assuming that the transistor 1300 is in a conductive condition and that the transistor 1310 is nonconductive, the cathode terminal of an input diode 1330 is biased positively with respect to its anode, while the cathode terminal of an input diode 1320 is biased negatively with respect to its anode. Thus, when a positive-going pulse is applied to the input terminals "a" and "b," this pulse is coupled through the diode 1320 to render the transistor 1300 nonconductive and to render the transistor 1310 conductive. When the next positive-going pulse is applied to the input terminals "a" and "b," this pulse is forwarded through the diode 1330 to render the transducer 1310 nonconductive and to render the transistor 1300 conductive. As the transistors 1300 and 1310 are shifted between alternate conductive and nonconductive conditions, a pair of output terminals "c" and "d" are shifted between ground and negative potential.

The flip-flop is operated to a normal or reset condition by the application of a positive-going or ground signal to a terminal "h" which renders the transistor 1310 nonconductive and thus renders the transistor 1300 conductive. This normal or reset condition of the flip-flop is illustrated in the logic diagram by the shading in the portion of the logic symbol to which the terminal "d" is connected. This indicates the normal application of ground to the terminal "d" by the conductive transistor 1300. The application of a negative potential to the output terminal "c" in the normal or reset condition of the flip-flop is represented by the unshaded portion of the symbol to which this terminal "c" is connected.

Delay Line

FIG. 14 of the drawings illustrates the logic symbol for a delay line which can comprise a mass of magnetostrictive material 1410 disposed between an input amplifier 1400 and an output amplifier 1420. The input amplifier 1400 responds to positive-going and negative-going signals applied to its input to apply an input signal to the magnetostrictive material 1410. At the end of a fixed time interval, an output signal from the magnetostrictive material 1410 is applied to the input of the output amplifier 1420. The output of this amplifier provides positive-going and negative-going signals corresponding to the delay line input signals and provides a ground output in the absence of signals. In the circuit illustrated in FIGS. 2–8 of the drawings, some of the delay lines provide a delay of ninety-five microseconds, which is equal to the duration of the time frame minus the period of one half of one time slot, and others of the delay lines provide a full time frame delay.

Half-Adder

The logic symbol for a half-adder or exclusive "OR" gate is shown in FIG. 15A, and a typical circuit which illustrates the half-adder by the use of logic symbols is shown in FIG. 15B. When both of a pair of input terminals "a" and "b" are maintained at or near ground potential, both of a pair of inverters 1500 and 1510 are maintained in a non-conductive condition so that a more negative potential is applied to the input of an inverter 1520. Thus, the inverter 1520 applies ground potential to an output terminal "c" in this condition. Similarly, when both of the input terminals "a" and "b" are maintained at a negative potential, an inhibit is applied to the emitters of the two transistors forming the inverters 1500 and 1510 so that these inverters remain in a nonconductive state. Thus, the inverter 1520 is held in a conductive state to place the output terminal "c" at ground potential.

However, when one of the input terminals "a" and "b" is placed at a negative potential and the other of these terminals is placed at ground potential, one of the inverters 1500 or 1510 is placed in a conductive condition so that the input to the inverter 1520 is clamped at ground potential. This maintains the inverter 1520 in a non-conductive condition so that the potential applied to the output terminal "c" drops to a negative potential. Accordingly, the output terminal "c" is provided with ground potential when like signals are applied to both of the input terminals "a" and "b," and the output terminal "c" is provided with a negative potential when different polarity signals are applied to the input terminals "a" and "b."

Monostable Multivibrator

A logic symbol for a monostable multivibrator is shown in FIG. 16A of the drawings, and a typical circuit represented by this logic symbol is illustrated in FIG. 16B. In the normal condition of the multivibrator, a transistor 1610 is in a nonconductive condition, and a transistor 1600 is in a conductive condition so that ground potential is applied to an output terminal "a" and a negative potential is applied to an output terminal "d." When a positive-going pulse is applied to either of a pair of terminals "b" or "d" or a negative-going pulse is applied to either of a pair of terminals "c" or "a," the monostable multivibrator is triggered into its unstable condition in which the transistor 1600 is not in conduction and the transistor 1610 is in a conductive condition. When the positive potential across a coupling condenser 1620 drops to the point at which the base electrode of the transistor 1600 again becomes negative with respect to its grounded emitter, the multivibrator returns to its normal or stable condition. Thus, the output terminal "a" is provided with a negative-going pulse of a variable duration dependent on the time constants of the components used in the circuit. The output terminal "d" is provided with a positive-going pulse of the same controllable duration.

DETAILED DESCRIPTION OF THE OPERATION OF THE SYSTEM

The electronic communication system shown in detail in FIGS. 2–8 of the drawings can include up to 256 trunks or subscriber stations, such as the stations 100 and 102, that can be connected over the channel or highway 104. The station 100 (FIG. 2), for instance, includes a subscriber transmitter 200 and a subscriber receiver 202 that are not only capable of transmitting and receiving audible frequency signals used in communication but also tone signals used to control the extension of a communication path over the common highway 104. This equipment can comprise, for instance, a subscriber station of the type disclosed in the copending application of William M. Woodhull and Marvin A Stern, Serial No. 761,-045, filed September 15, 1958, now U.S. Patent No. 3,066,195, which application is assigned to the same assignee as the present application.

The subscriber transmitter 200 is coupled through a transformer 204 to the input of a resonant transfer filter 208, and the output of this filter is connected to the inputs of a pair of voice gates 214 and 216. The input of the subscriber receiver 202 is coupled through a transformer 206 to the output of an amplifier 210, the input of which is connected to the output of a resonant transfer filter 212. The input to the filter 212 is connected to the output of a pair of voice gates 218 and 220. The gates 214 and 218 are used when a call is extended to the station 100, and the gates 216 and 220 are used when the station 100 is a calling circuit. The components 200, 202, 204, 206, 208, 210, 212, 214, 216, 218 and 220 form the line circuit 106 and the subscriber station 100.

The gates 214, 216, 218 and 220 can comprise blocking oscillator gates of the type shown and described in Pearce et al. Patent No. 2,933,564. These gates connect the common transmission channel 104 with the stations 100 and 102 in related time slots.

The station 102 and the line circuit 108 are identical to the station 100 and the line circuit 106 connected thereto. Accordingly, the station 102 (FIG. 3) includes a subscriber transmitter 348 and a subscriber receiver 350 that are coupled to a pair of resonant transfer filters 338 and 340 through a pair of transformers 344 and 346 and an amplifier 342. The resonant transfer filters 338 and 340 are connected to four voice gates 330, 332, 334 and 336 that are identical to the gates 214, 216, 218 and 220 in the line circuit 106.

When a communication path is to be extended between one of the stations 100 or 102 and the control equipment in the remainder of the system or between two of the subscriber stations, two pairs of voice gates, such as the gates 214, 216, 218, 220, 300, 332, 334 and 336, are supplied with negative-going pulses in the time slot assigned to the call. Audible frequency intelligence or control signals can then be transmitted between these components and over the common highway or channel 104 by the use of any of the transmitting techniques well known in the art. In the system shown in the drawings, this transmission of control and intelligence information is accomplished by the use of the resonant energy transfer technique described in detail in a conference paper No. 59–210 by J. C. Perkins, Jr. This paper is published by the American Institute of Electrical Engineers and is entitled "Transmission Aspects of an Electronic Switchboard Employing Time Division Multiplexing."

As indicated above, the voice gates in the line circuits 106 and 108 are selectively supplied with negative-going pulses in the time slots assigned to different communication paths by the calling line store 114 (FIG. 4) and the called line store 115 (FIG. 5). Accordingly, the called voice gates 214, 218, 330, and 334 are connected to the called line store 115 and the calling voice gates 216, 220, 332, and 336 are connected to the calling line store 114. Since the calling line store 114 and the called line store 115 are substantially identical, the details of only the calling line store 114 are shown in detail in the drawings.

The calling line store 114 (FIG. 4) includes a delay means 400 having a delay interval of ninety-five microseconds in which time slot idle-busy and calling line designation information is stored in dynamic form and a plurality of bistable circuits or flip-flops 431–439 in which this information is stored in static form for a period of five microseconds during each time frame. Thus, the information circulating in the store 114 is stored in dynamic form in the delay line 400 for ninety-five microseconds and is stored in static form in the flip-flops 431–439 for the remaining five microseconds of each one hundred microseconds time frame.

In its condition prior to the storage of calling line designation information, the delay line 400 stores the pattern of positive-going and negative-going pulses shown in FIG. 17A of the drawings in each of the ten time slots. As illustrated therein, each of the ten time slots of ten microseconds duration is divided into a first portion of five microseconds duration and a second portion of five microseconds duration. The second portion of each time slot is divided into ten segments in which are stored ten positive-going synchronizing pulses. The first portion of each time slot is divided into ten segments, the first of which includes a positive-going synchronizing signal and a negative-going data signal representing an idle condition of the slot. The remaining nine segments of the first portion of each time slot include only positive-going synchronizing signals. The positive-going synchronizing signals are continuously supplied to the input of the delay line 400 from the clock pulse source, and the negative-going signals are supplied to the input of the delay line 400 either from the calling line finder 118 or the output of an "OR" gate 402.

Assuming that the pattern of positive-going and negative-going signals shown in FIG. 17A is applied to the input of the delay line 400, the first positive-going synchronizing pulse appears at the output of the delay line after an elapsed time of ninety-five microseconds. This pulse is applied to the input of nine "AND" gates 421–429 and the common input of a ten stage counter 410. This first positive-going signal has no effect on the "AND" gates 421–429. However, the ring counter 410, which can be one of the types well known in the art, is operated step-by-step in response to positive-going signals on the common input lead. Thus, the first positive-going pulse derived from the output of the delay line 400 operates the first counting stage indicated as "1" in FIG. 4 to a set condition in which a negative enabling potential is applied to the lower input of the "AND" gate 421 and one input of an "AND" gate 411. The "AND" gate 411 is one of nine "AND" gates 411–419 whose outputs are connected to the inputs of the "OR" gate 402. The gates 411–419 are inhibited by the ground signals applied to their upper inputs either directly or through an "AND" gate 404. The enabling potential applied to the lower input of the "AND" gate 421 conditions this gate for response to the next output pulse from the delay line 400.

When the negative-going pulse indicating the idle condition of the time slot is applied to the common output conductor from the delay line 400, the setting of the counter 410 is not changed because this counter is advanced only by positive-going signals. However, the "AND" gate 421 is now fully enabled so that its output drops to a negative potential. At the end of the negative-going pulse, the output of the gate 421 rises toward ground potential and provides a positive-going signal that actuates the flip-flop 431 to its set condition. This represents the presence of a data bit in the first segment of the first portion of the time slot to indicate the idle condition of the time slot.

The following or second positive-going synchronizing signal provided at the output from the delay line 400 operates the ring counter 410 to its second setting in which the negative enabling potential is removed from the gates 411 and 421 and is applied to the gates 412 and 422. Since there are no additional negative-going signals in the first portion of the time slot due to the fact that the time slot is not storing a line designation, none of the gates 422–429 are fully enabled and none of the flip-flops 432–439 are set as the remaining eight positive-going synchronizing pulses advance the counter 410 to its last or tenth stage in which none of the gates 411–419 and 421–419 are even partially enabled. When the tenth synchronizing pulse is applied to the ring counter 410, the tenth stage thereof is set, and a negative potential is applied to both inputs of a flip-flop 406. However, this negative-going signal does not change the reset condition of this flip-flop.

However, when the first positive-going pulse in the second portion of the time slot is applied to the common output conductor, the first stage of the counter 410 is operated to its set condition to apply an enabling potential to the gates 411 and 421, and the output of the last or tenth stage of this counter rises to ground potential to provide a positive-going pulse that operates the flip-flop 406 to its alternate or set condition. In this state, a negative potential is applied to one input of the "AND" gates 404 and 411 and one input of an "AND" gate 444. The other input of the gate 404 is held at a negative potential at the output of an inverter 408 so that the gate 404 now provides a negative enabling potential to one input of each of the gates 412–419. The gates 411–419 are now conditioned to transfer the settings of the flip-flops 431–439 through the "OR" gate 402 to the input of the delay line 400.

As indicated above, only the flip-flop 431 was set during the preceding cycle of operation of the counter 410. Accordingly, the negative potential provided at the output of this flip-flop is forwarded through the "AND" gate 444 and an "OR" gate 442 to the lower input of the gate 411. The other two inputs to the gate 411 are enabled by the flip-flop 406 and the first stage of the counter 410. The output of the gate 411 now drops to a more negative potential that is forwarded through the "OR" gate to the input of the delay line 400. This negative-going pulse represents the idle condition of the time slot and follows the related first positive-going synchronizing pulse provided by the clock pulse source at what is the start of the next time frame insofar as this particular time slot is concerned.

When the second positive-going synchronizing signal in the second portion of the time slot is supplied from the output of the delay line 400, the counter 410 is advanced to its second position so that the enabling potential is removed from the gates 411 and 421 and is applied to the gates 412 and 422. One input to the gate 412 and to each of the remaining gates 413–419 is connected to the output of one of the flip-flops 432–439, respectively. Since none of these flip-flops were set in the preceding cycle of operation of the counter 410, none of the gates 412–419 can be fully enabled during this cycle of operation of the counter. Thus, the counter 410 is operated by the remaining positive-going signals from the output of the delay line 400 during the remainder of the second portion of the time slot without causing the application of negative-going signals through the "OR" gate 402 to the input of the delay line 400. Thus, the pattern of positive-going and negative-going signals supplied to the input of the delay line 400 corresponds exactly to that illustrated in the first portion of the waveform shown in FIG. 17A of the drawings.

When the last stage of the counter 410 is reset and the first stage of the counter 410 is set by the first positive-going synchronizing signal in the next time slot, the flip-flop 406 is operated to its reset condition so that the gate 404 is inhibited to prevent the transfer of information from the flip-flops 432–439 to the input of the delay line 400. The gate 421 can be enabled to permit the circulation of a negative-going pulse in the first position or segment of the first portion of each time slot representing the idle condition of the slot. In addition, when the flip-flop 406 is reset to its normal condition, a positive-going pulse is coupled through a capacitor 446 and a diode 448 to an emitter follower 450. This follower is connected to the reset leads of all of the flip-flops 431–439 and serves to reset these bistable storage units to a normal condition in which they are capable of receiving and storing the items of information stored in the first portion of the next time slot.

Accordingly, the ring counter 410 is operated through two cycles of operation by the two groups of positive-going synchronizing signals contained in the first and second sections of each time slot. During the first portion of each time slot the gates 421–429 are enabled in sequence to transfer data bits from the line 400 to a static storage in the flip-flops 431–439. During its second cycle of operation, the ring counter 410 enables the gates 411–419 in sequence so that the data bits stored in the flip-flops 431–439 are applied to the input of the delay line 400 for circulation. Since the delay of the line 400 is ninety-five microseconds and since the data bits remain stored in static form in the flip-flops 431–439 for a five microsecond interval, the loop including the delay line 400 and the flip-flops 431–439 provides the time frame delay interval of one hundred microseconds. Thus, any information inserted at the input of the delay line 400 is continuously circulated in a particular time slot in the time frame. The called line store 115 includes a delay line similar to the delay line 400 and a plurality of flip-flops similar to the flip-flops 431–439 that operate in the same manner as in the calling line store 114 to circulate a designation stored therein.

As indicated above, the register allotter 110 (FIG. 6) is controlled by the calling line store 114 and the plurality of registers, such as the register 112, to assign a free register for use in controlling the extension of a communication path over the highway 104 and to assign an idle time slot for use by the allotted register. The register allotter 110 includes a number of gates corresponding to the number of registers provided in the system so that if the system shown in FIGS. 2–8 of the drawings is assumed to include five registers for use in extending connections, the register allotter 110 includes five gates 651–655. Each of these gates is individual to one of the registers and includes an input that is provided with a negative enabling potential when the associated register is free. If the register 112 is available for use in extending a connection, a negative potential is forwarded from the register 112 over a conductor 661 to the middle input of the gate 651 individual to this register. An additional input to each of the gates 651–655 is connected to the output of the flip-flop 431. As described above, the flip-flop 431 is set so that a negative enabling potential is applied to the gates 651–655 whenever the time slot being read out of the delay line 400 to the flip-flops 431–439 is in an idle condition. Thus, when an idle time slot is available and one of the registers, such as the register 112 is free, two of the inputs to one of the gates, such as the gate 651, are enabled.

The remaining inputs to the gates 651–655 are individually connected to the five stages of a ring counter 660 that sequentially allots the registers for use. The ring counter 660 is advanced step-by-step by a source of clock pulses appearing at the frame rate of 10 kc. Thus, the ring counter 660 is advanced step-by-step at the end of each time frame. Assuming that the counter 660 is in its first setting, that an idle time slot is available, and that the register 112 is free for use, the gate 651 is completely enabled so that a negative-going signal is forwarded from its output to the input of a decimal-to-binary converter 640.

The converter 640, which can be of any of the well known types, is connected to the outputs of the gates 651–655 and translates the decimal designations of the registers into corresponding binary designations. The converter 640 is operated by the negative-going signal received from one of the gates 651–655 to apply positive-going signals to selected ones of a plurality of emitter followers 641, 642 and 644, representing the binary digits "1," "2," and "4," respectively, in accordance with the binary code corresponding to the number of the seized register. These signals are forwarded over a cable 662 to the supervisory control circuit 116 in the time slot in which the input gate 651 was enabled by the calling line store 114. If the decimal designation of the register 112 is assumed to be "1," the amplifier 641 provides a positive-going singal and the amplifiers 642 and 644 do not provide such a signal. This binary coded designation of the register 112 is transferred to and stored in the supervisory control circuit 116 in the assigned time position.

The supervisory control circuit 116 (FIG. 8) includes a signal circulating and storing circuit similar to that provided in the calling line store 114 and, more specifically, comprises a delay line 800 having a delay time of ninety-five microseconds and a static data storage unit 850 including five bistable circuits or flip-flops 851–855 representing the binary values "1," "2," "4," "8" and "16," respectively. The inputs to the flip-flops 851, 852 and 853 are connected to the outputs of the amplifiers 641, 642 and 644, respectively. Accordingly, the signal provided by the amplifier 641 operates the flip-flop 851 to its set condition and the remaining flip-flops 852–855 remain in their reset condition so that the binary coded representation of the designation "1" of the register 112 is now stored in the static storage unit 850.

The outputs of the flip-flops 851–855 are connected to a plurality of gates 831–835 that form a portion of the circuit for supplying signals to the input of the delay line 800 and to the input of a binary-to-decimal converter 860 that converts the binary code stored in the flip-flops 851–852 to a marking condition representing a corresponding decimal value. As in the case of the converter 640, the converter 860 can comprise any of the circuits well known in the art. The output of the converter is connected to a plurality of gated emitter followers or amplifiers 861–866. The converter 860 applies an enabling potential to one input of the output amplifiers 861–866 in accordance with the decimal number corresponding to the binary value stored in the flip-flops 851–855. Since only the flip-flop 851 is set, the converter 860 provides an enabling potential to the uppermost or "1" representing amplifier 861, the output of which is connected to the register 112. Other amplifiers, such as the amplifier 862, are individually connected to the other registerds and are enabled by the storage of different command signals, such as "2" etc., in the unit 850.

To provide a means for transferring the designation "1" of the register 112 now stored in the flip-flops 851–855 to the delay line 800, the supervisory control circuit 116 includes a ring counter 840 identical to the ring counter 410 in the calling line store 114. The input to the delay 800 is connected to the clock pulse source and thus continuously circulates a series of positive-going synchronizing signals that operate the ring counter 840 step-by-step in synchronism with the counter 410 in the calling line store 114. Upon receipt of the first positive-going synchronizing pulse in the second portion of the time slot in which the gate 651 was enabled, the first stage of the counter 840 is set and the tenth stage of this counter is reset to operate a flip-flop 858 to its set condition. This flip-flop now applies a negative enabling potential to the other inputs of all of the amplifiers 861–866. Since only the inverter 861 is enabled by the converter 860 under the control of the flip-flops 851–855, a negative-going signal in the calling time slot is transferred to the register 112, and this time slot is stored in the register 112 to indicate that this is the time slot assigned for use by the register 112 in establishing a communication path. The storage of this time slot pulse controls the register 112 to remove the free marking from the gate 651.

The negative signal provided at the output of the flip-flop 858 is also forwarded to one input of an "AND" gate 806, the other input of which is enabled at the output of an inverter 804. Thus, the output of the "AND" gate 806 provides one enabling input to each of five "AND" gates 811–815 that are effective through an "OR" gate 808 to apply signals to the input of the delay line 800 representing the binary coded value stored in the storage unit 850. One other input of each of the gates 811–815 is connected to a corresponding one of the counting stages in the counter 840, and the remaining input of each of these gates is connected either directly to the output of one of the gates 831–835 or indirectly through three "OR" gates 820, 822 and 824.

As indicated above, only the flip-flop 851 in the storage unit 850 is set at this time. Accordingly, when the first stage of the counter 840 is operated to a set condition, the negative potential forwarded from the output of the flip-flop 851 through the gate 831 completes the enabling of the gate 811 so that a negative-going signal is forwarded through the "OR" gate 808 to the input of the delay line 800. Thus, a negative-going signal representing the presence of a bit in the binary "1" position is stored in the delay line 800 in the time slot assigned for use by the calling line store 114 and the register allotter 110. When the next or second positive-going synchronizing signal is received from the output of the delay line during the second segment of the time period, the gate 811 is disabled and the second stage is set to partially enable the gate 812. However, since the flip-flop 852 is not set, a negative-going signal is not applied through the "OR" gate 808 to the input of the delay line 800. Since none of the remaining flip-flops 853-855 have been operated to a set condition, the counter 840 completes its cycle of operation under the control of the positive-going synchronizing pulses supplied from the output of the delay line 800 without applying additional negative-going signals to the input of the delay line 800. Thus, at the completion of this cycle of operation of the counter 840, a single negative-going pulse in the binary "1" position is stored in the delay line 800 in the assigned time position.

At the beginning of the next time slot, the first positive-going synchronizing pulse sets the first stage of the counter 840 and resets the tenth stage to reset the flip-flop 858. The resetting of the flip-flop 858 removes the enabling potential from the amplifiers 861–866 and from the output gates 811–815. In addition, when the output of the flip-flop 858 returns to ground, a capacitor 872 forwards a positive-going pulse through a diode 874 and an emitter follower 876 to reset the flip-flops 851–855 in the storage unit 850 to a normal condition. This conditions these flip-flops to receive any digital designation stored in the delay line 800 in the following time slot.

Following a time elapse of one frame, the first positive-going synchronizing pulse in the assigned time slot is applied to the counter 840 to operate the counter to its first setting in which a negative enabling potential is again applied to the gate 811 and also the first of five "AND" gates 841–845, the outputs of which are connected to the inputs of the flip-flops 851–855. Since the flip-flop 858 is in its reset condition, the gates 811–815 are not enabled and the operation of the counter 840 does not affect these gates. However, the second input to each of the gates 841–845 is connected to the output of the delay line 800. When the negative-going pulse in the first position representing the binary value "1" is applied to the common output lead from the delay line 800 following the first synchronizing pulse, the gate 841 is enabled to apply a more negative potential to the input of the flip-flop 851. The trailing edge of this negative-going pulse sets the flip-flop 851 so that a binary "1" is stored.

When the second, third, fourth, and fifth synchronizing pulses in the first portion of the time frame are supplied from the output of the delay line 800 to the counter 840, this counter advances step-by-step to enable the gates 842, 843, 844 and 845 in sequence. However, in view of the fact that no additional negative-going pulses are provided in these positions, the flip-flops 852–855 are not set. The counter then advances through its sixth to tenth stepping positions under the control of the remaining synchronizing pulses in the first portion of the seized time slot. During the second portion of the assigned time slot, the converter 860 forwards a negative going signal in the assigned time slot through the amplifier 861 to the seized register 112, and the counter 840 returns the stored digital entry "1" to the input of the delay line 800. Thus, the digital designation "1" identifying the seized register 112 continuously circulates in the delay line 800 in the supervisory control circuit 116 until such time as this designation is to be removed.

When a signal in the assigned time slot is supplied to the register 112 from the supervisory control circuit 116, the register 112 erases the idle mark from this time slot in the calling time store 114. More specifically, the register 112 supplies a more positive inhibiting signal in the seized time slot to a conductor in a cable 606 that is connected to the right-hand input of the "AND" gate 444. When the flip-flop 406 is next operated to its set condition during this time slot, the gate 444 is not enabled and the lower input of the gate 411 remains at a more positive potential. Accordingly, a negative-going signal cannot be applied to the input of the delay line 490 in the first position of the first half of the assigned time slot. The absence of a negative-going pulse in this first position indicates that the time slot is busy.

Thus, the calling line store 114 now circulates only synchronizing pulses in the time slot assigned to the register 112, and the delay line 800 in the supervisory control circuit 116 continuously circulates only the designation "1" of the assigned register 112, also in the seized time slot.

When an idle time slot has been assigned to the free register 112 and when the designation of this register has been stored in the supervisory control circuit 116, the calling line finder 118 (FIG. 7) is placed in operation to transfer the designation of an idle line to the calling line store 114 for storage therein. The calling line finder 118 includes a line designation storing means consisting of a binary counter 720 including a plurality of flip-flops 721–728 which are connected for normal binary counting progression and which represent the values "1," "2," "4," "8," "16," "32," "64" and "128," respectively. The outputs of the flip-flops 721–728 are connected to eight half-adders 731–738 forming a calling line busy test circuit and over a cable to eight similar half-adders in a called line busy test circuit 740. The other inputs to the half-adders 731–738 are connected to corresponding ones of the storage flip-flops 432–439 in the calling line store 114. The half-adders in the calling line busy test circuit 740 are connected over a cable 508 to the corresponding storage flip-flops in the called line store 115 (FIG. 5).

Assuming that the station 100 is designated as "150" and that the counter 720 is in a setting representing this designation, the flip-flops 721, 724, 726, and 727 are in a reset condition and the flip-flops 722, 723, 725 and 728 are in a set condition. Thus, the upper input leads to the half-adders 731, 734, 736 and 737 are provided with ground potential, and the upper input leads of the half-adders 732, 733, 735 and 738 are provided with a negative potential. The lower input leads of all of these half-adders are provided with ground or negative potentials in accordance with the settings of the corresponding flip-flops 432–439 in the calling line store 114 during the successive time slots of the time frame. So long as the two inputs to each of the half-adders 731–738 are provided with different or unlike potentials indicating a lack of correspondence between the setting of the counter 720 and the setting of the flip-flops 432–439, the outputs of the half-adders 731–738 remain at ground potential. These outputs are connected through an "OR" gate 742 to one input of an "AND" gate 744. Thus, the output of the "AND" gate 744 is clamped at ground potential for so long as different potentials are applied to the two inputs of at least one of the half-adders 731–738 to indicate a lack of correspondence between a line designation stored in the calling line store 114 and the line designation stored in the counter 720.

However, if the designation stored in the counter 720 is the same as the line designation stored in any one of the time slots in the calling line store 114, identical potentials are applied to both of the inputs of all of the half-adders 731–738, and all of these half-adders forward negative potentials through the "OR" gates 742 and 744 to the input of an inverter 745. Similarly, if a coincidence between the setting of the counter 720 and a designation stored in one of the time slots in the calling line store 115 is detected by the called line busy test circuit 740, a negative potential is forwarded through the other input of the "OR" gate 744 to the input of the inverter 745. The establishment of this condition indicates that the line which has been tentatively assigned for association with the seized register 112 is in a busy condition so that a connection between the register and this communication circuit cannot be established.

Accordingly, when a negative potential is applied to the input of the inverter 745, one input of an "AND" gate 746 is inhibited. The other input to this gate is connected to a source of clock pulses that provide a negative-going pulse of five microseconds' duration during the second half of each time slot. Thus, the establishment of a busy condition in the calling line finder 118 inhibits the output of the gate 746 during the time slot in which the busy condition is detected and maintains an inverter 748 that is connected to the output of the gate 746 in a nonconductive condition. The output of the inverter 748 is connected to one input of an "AND" gate 750, the other input of which is connected to the clock pulse source. Thus, the output of the gate 750 drops to a more negative potential during the second half of the time slot in which the busy condition is detected to place an inverter 752 in conduction. When the output of the inverter 752 rises toward ground potential, a time slot counter 760 including a plurality of flip-flops 761, 762, 764 and 768 representing the binary values "1," "2," "4" and "8" is reset to a normal condition. In addition, the positive-going pulse provided at the output of the inverter 752 is applied to the input flip-flop 721 in the counter 720 so that this counter is advanced to a setting representing the calling circuit designated by the next highest number. At the end of the five microsecond pulse from the clock source, the inverter 752 is restored to a nonconductive condition, and the calling line finder 118 is conditioned to determine the idle or busy condition of the next line.

Assuming however, that the station 100 is in an idle condition so that the output of the "OR" gate 744 remains at ground potential, the inverter 745 is not placed in a conductive condition, and the right-hand input of the "AND" gate 746 remains enabled. Each negative-going pulse supplied by the clock pulse source during the second half of each time slot renders the inverter 748 conductive. When the inverter 748 is rendered conductive, the left-hand input of the "AND" gate 750 is inhibited to prevent the operation of the inverter 752. In addition, each time that the inverter 748 is rendered conductive during each time slot, a positive-going operating signal is applied to the two inputs of the flip-flop 761 in the time slot counter 760. Accordingly, when ten operating pulses have been applied to the input of the flip-flop 761 representing an elapsed time of ten time slots or one time frame, the flip-flops 761 and 764 are in a reset condition and the flip-flops 762 and 768 are in a set condition.

The outputs of the flip-flops 761, 762, 764 and 768 are connected to the inputs of an "AND" gate 770 so that when the time slot counter 760 reaches a setting representing "10," the gate 770 is fully enabled to apply a more negative potential to the input of an inverter 772. When the inverter 772 is thus rendered conductive, a positive-going pulse is applied to the input of a flip-flop 774 to operate this flip-flop to its set condition so that a negative potential is applied to one input of a plurality of gates 711–718. These gates provide means for transferring the setting of the counter 720 to the input of the delay line 400 in the calling line store 114 and are individually connected to the outputs of the flip-flops 721–728, respectively. Another set of the inputs to the gates 711–718 is connected to the outputs of the second through ninth stages of the ring counter 410 in the calling line store 114 so that these gates are enabled in sequence. The remaining input to each of the gates 711–718 is connected to a terminal 719 that is connected in common to all of the registers in the system. The terminal 719 receives a five microsecond, negative-going signal in the second portion of the time slot assigned for the use by an allotted register, such as the register 112.

In the illustrative example in which the counter 720 is adjusted to a setting representing the designation "150," the flip-flops 722, 723, 725 and 728 are in a set condition so that the corresponding gates 712, 713, 715 and 718 are conditioned, the remaining gates being inhibited by the ground output signals provided by the reset flip-flops 721, 724, 726 and 727. When the register 112 provides a negative-going signal at the terminal 719, an additional enabling condition for the gates 711–718 is satisfied so that the conditioned ones of these gates are rendered responsive to control by the ring counter 410 in the calling line store 114. When the first synchronizing pulse in the second portion of the assigned time slot is applied to the ring counter 410, the first stage thereof is rendered conductive, but a negative-going pulse is not forwarded to the input of the relay line 400 because the gate 411 is inhibited by the reset flip-flop 431.

When the second synchronizing pulse is received from the output of the delay line 400 in the seized time slot, the second stage of the ring counter 410 applies a negative enabling potential to the gate 412 and also to one input of the gate 711. The gate 412 is not enabled because the flip-flop 432 has not been set due to the fact that no designation is stored in the seized time slot at this time. Further, the gate 711 is not enabled because the associated flip-flop 721 in the designation counter 720 is in a reset condition.

When the third synchronizing pulse operates the third stage of the ring counter 410, the gates 413 and 712 receive an enabling potential. Since the flip-flop 433 has not been set, the gate 413 is not enabled. However, the flip-flop 722 representing a binary value "2" has been set, and the gate 712 is fully enabled to forward a negative-going potential through the "OR" gate 708 to the input of the delay line 400. The trailing edge of the first negative-going pulse provided at the output of the "OR" gate 708 also sets a flip-flop 700. Thus, the input of the delay line 400 has now been provided with three positive-going synchronizing pulses followed by a negative-going pulse, as illustrated in FIG. 17B of the drawings. This represents the busy condition of the time slot, the absence of a binary bit representing the value "1," and the presence of a binary bit representing the value "2."

The ring counter 410 continues to its tenth stepping position during which the remainder of the gates 414–419 and 713–718 are enabled in sequence. The gates 713, 715 and 718 provide negative-going pulses in the fourth, sixth, and ninth parts of the first portion of the time slot representing the values "4," "16," and "128." Thus, when the ring counter 410 has reached its tenth stepping position, the assigned time slot in the delay line 400 has been provided with the pattern of positive-going and negative-going pulses illustrated in FIG. 17B representing the busy condition of the time slot and the binary coded representation of the line designation "150."

When the negative-going pulse is removed from the terminal 719, the trailing edge of this pulse operates the previously set flip-flop 700 to its reset condition so that a capacitor 702 forwards a positive-going pulse through a diode 704 and an emitter follower 706 to supply an operating signal to the first flip-flop 721 in the counter 720. This operates the counter 720 to its next highest setting representing the next line whose idle or busy condition is to be determined. In addition, the positive-going pulse provided at the output of the emitter 706 resets the flip-flop 774 so that the enabling potential is removed from the gates 711–718. The positive-going pulse at the output of the emitter follower 706 also resets the time slot counter 760 to its normal condition so that the enabling condition for the "AND" gate 770 is removed. The store 114 is reset in the manner described above.

After a ninety-five microsecond time delay, the data bits and synchronizing signals shown in FIG. 17B appear sequentially at the output of the delay line 400. The synchronizing pulses advance the ring counter 410 through ten steps during which the enabled gates 423, 424, 426 and 429 actuate the flip-flops 433, 434, 436 and 439 to set conditions representing the values "2," "4," "16" and "128," respectively. Thus, the calling line designation and the time slot busy condition are now stored in the storage unit 430 in static form after having been dynamically stored in the magnetic delay line 400 during the preceding ninety-five microsecond interval. The pattern of positive and negative potentials provided by the conductive conditions in the flip-flops 431–439 is applied to the input of the binary-to-decimal converter 460, to the inputs of the half-adders 731–738 in the calling line finder 118, and to the inputs of the gates 411–419 in the calling line store 114. The signals applied to the half-adders 731–738 mark the line circuit 106 as busy.

The potentials applied to the binary-to-decimal converter 460, which can be of any of the types well known in the art, control this converter to apply an enabling potential to one input of a particular one of a plurality of amplifiers or emitter followers 461. Each of the amplifiers or followers 461 is connected to one pair of calling gates in one of the line circuits. As an example, the uppermost amplifier 461 is connected to the calling gates 216 and 220 in the line circuit 106. The converter 460 applies an enabling potential to one input of a selected one of the units 461 in accordance with the decimal value of the binary coded notation stored in the flip-flops 431–439. Since the value stored in the storage unit 430 is assumed to be "150," the designation of the line circuit 106, the converter 460 applies an enabling potential to the input of the uppermost amplifier 461.

When the ring counter 410 is operated from its tenth to its first position by the first synchronizing pulse in the second portion of the seized time slot, the flip-flop 406 is set, as described above, so that an enabling potential is forwarded through the gate 404 to all of the gates 412–419. In addition, this negative potential is forwarded to a common input to all of the amplifiers 461. This renders the conditioned uppermost amplifier 461 operative to supply a negative-going pulse of five microseconds duration to the voice gates 216 and 220 so that the resonant transfer filters 208 and 212 in the line circuit 106 are connected to the common highway 104 in the seized time slot position. During the succeeding cycle of operation of the ring counter 410, the gates 412–419 are enabled in sequence so that the gates 413, 414, 416 and 419 conditioned by the set flip-flops 433, 434, 436 and 439 apply negative-going pulses to the input of the delay line 400 in the positions shown in FIG. 17B of the drawings. Thus, the calling line designation "150" and the indication of the busy condition of the time slot are again applied to the input of the delay line 400.

When the ring counter 410 reaches the end of this cycle of operation and is returned to its first setting by the first synchronizing pulse in the next following time slot, the flip-flop 406 is operated to its reset condition so that the enabling potential is removed from the amplifiers 461 to terminate the application of the negative-going pulse to the voice gates 216 and 220. In addition, the capacitor 446 again provides a positive-going pulse that is forwarded through the diode 448 and the emitter follower 450 to reset the flip-flops 431–439 to their normal condition for receiving and storing the designation, if any, in the next time slot.

The calling line designation "150" identifying the line circuit 106 now continuously circulates in the calling line store 114 in the time position assigned thereto so that this line circuit is connected to the highway or common communication channel 104 in the assigned time slot and during the second portion thereof. As set forth above, the register 112 that has been seized for use is also connected to the highway 104 in the same time slot so that the line circuit 106 and the register 112 are interconnected for communication. The register 112 includes a multi-frequency detector that examines the highway 104 in the assigned time slot to check for the presence of a seize tone indicating the existence of a calling condition at the line circuit 106. The multifrequency detector provided in the register 112 can be of any of the types well known in the art and can comprise a multifrequency signal detector of the type described in either a Transaction Paper No. 60-820, published by the American Institute of Electrical Engineers, and entitled "Voice Immunity of Tone Operated Switching Centers," or in a copending application of Edward R. Schmidt, Serial No. 814,845, filed May 21, 1959, which application is assigned to the same assignee as the present application.

If a seize signal is not received from the line circuit 106 within the time allotted for the reception of this signal, the register 112 restores itself to a normal or free condition and forwards a negative signal over the conductor 661 to the register allotter 110 to indicate that the register 112 can be seized for additional use. In addition, the register 112 forwards a negative signal over a conductor in the assigned time slot to one input of the gate 442 and one input of an "OR" gate 440. The negative potential applied to the "OR" gate 442 is forwarded to the lower input of the gate 411, and th enegative potential in the assigned time slot applied to the "OR" gate 440 is forwarded to the input of an inverter 408 to render this inverter conductive. When the inverter 408 is rendered conductive, an inhibit signal is applied to the "AND" gate 404 so that the gates 412-419 cannot be enabled. Thus, when the ring counter 410 is operated through its cycle of operation during the second portion of the time slot assigned to the register 112, the designation "150" of the line circuit 106 stored in the unit 430 cannot be returned to the input of the delay line 400. This erases this designation from the calling time store 114. Further, since the time slot previously seized by the register 112 is now idle, the negative potential provided by the "OR" gate 442 permits the gate 411 to be fully enabled in the first position of the ring counter 410 so that a negative-going pulse is applied to the input of the delay line 400 to indicate that this time slot is now idle. The pattern now stored in the previously seized time slot is that shown in FIG. 17A of the drawings.

The register 112 also returns a negative-going pulse in the assigned time slot to the lower input of an "OR" gate 802 which is forwarded through this "OR" gate to the input of an inverter 804. When the inverter 804 is rendered conductive, the "AND" gate 806 is inhibited to inhibit the gates 811-815. Thus, the designation "1" identifying the register 112 is cleared from the delay line 800 in the supervisory control circuit 116, and the binary-to-decimal converter 860 and the uppermost one of the amplifiers 861 no longer supplies a pulse in the previously seized time slot to the register 112.

Assuming, however, that the register 112 receives a seize tone from the line circuit 106 indicating that this circuit is in a calling condition, the register 112 returns dial tone from a generator provided therein over the highway 104 to the line circuit 110 through the gate 220 that is opened in the assigned time slot. Upon receipt of the dial tone, the subscriber at station 100 is advised that the digits identifying the called subscriber can now be dialed. These digits are transmitted over the common highway 104 and the gate 216 in the assigned time slot and are received by and stored in the register 112. When all of the digits necessary to identify the called line circuit or station, such as the line circuit 108 connected to the station 102, the register 112 applies a pattern of negative potential to the conductors in a cable 604 corresponding to the binary coded representation of the called line designation. These signals are forwarded to the route selector 120.

The route selector 120 (FIG. 5) includes eight half-adders 521-528 for performing a busy test in which the designation stored in the register 112 is compared with the designations stored in the calling line store 114. The route selector 120 also includes a called circuit busy test circuit 540 in which the designation stored in the register 112 is compared with the designations stored in the called line store 115 and eight gates 511-518 that are used to store called line designations in the called line store 115. The binary coded markings representing the designation of the called line 108 are transferred over the cable 604 to one input of the gates 511-518, to one input of the half-adders 521-528, and to one input of the corresponding half-adders in the called circuit busy test circuit 540. Thus, the gates 511-518 are partially enabled in accordance with the binary coded designation stored in the register 112, and the upper inputs to the half-adders 521-528 are selectively provided with a pattern of ground and negative potentials in accordance with the binary coded designation of the called line. The other inputs to the half-adders 521-528 are connected to the outputs of the flip-flops 432-439 in the calling line store 114.

The busy test circuit including the half-adders 521-528 operates in substantially the same manner as the busy test circuit including the half-adders 731-738 in the calling line finder 118. Thus, during successive time slots, the called line designation stored in the register 112 is compared with the designation stored in the calling line store 114. If identical designations are not found in any of the ten time slots, the half-adders 521-528 maintain a ground potential on the left-hand input of an "OR" gate 534 through an intermediate "OR" gate 530. However, in the event that the called line designation stored in the register 112 is identical to one of the designations stored in one of the time slots in the calling line store 114 or one of the designations stored in one of the time slots in the called line store 115, either the "OR" gate 530 or the corresponding "OR" gate in the called circuit busy test circuit 540 forwards a negative potential through the "OR" gate 534 to the input of an inverter 542. This renders the inverter 542 conductive so that an inhibiting potential is applied to one input of an "AND" gate 536.

The other input of this "AND" gate is connected to a clock pulse source that provides a negative-going, five microsecond pulse during the second half of each time slot. Since the gate 536 is inhibited, an inverter 538 connected to the output of the gate 536 remains in a nonconductive state so that one input of an "AND" gate 534 is enabled. The negative-going pulse occurring during the second portion of the time slot in which the busy condition was detected completes the enabling of the "AND" gate 544 so that an inverter 546 is placed in conduction to apply a positive-going pulse to the input of a flip-flop 600. This operates the flip-flop 600 to its set condition so that a line-free flip-flop 564 and four flip-flops 551, 552, 554 and 558 in a time slot counter 550 are operated to their reset condition. The resetting of the flip-flops 551, 552, 554, 558 and 564 prevents the establishment of a condition in the route selector 120 that falsely indicates an idle condition of the called line.

When the flip-flop 600 is set, a negative potential is also forwarded through an "OR" gate 602 to partially enable three "AND" gates 603, 632 and 634. The other input to the gate 603 is connected to the output of an "OR" gate 663 that supplies a negative-going pulse in the time slot assigned to the register, such as the register 112, then supplying a called circuit designation to the route selector 120. This negative-going signal, which occurs during the second portion of the seized time slot, is forwarded through the gate 603 and the "OR" gate 802 to render the inverter 804 conductive. This inhibits the gate 806 during the second portion of the calling time slot so that the gates 811–815 are inhibited to erase the digital designation "1" identifying the register 112 from the delay line 800 in the supervisory control circuit 116.

The negative-going pulse from the gate 663 is also applied to one input of each of the gates 632 and 634. These gates and an "OR" gate 636 form a control means 630 for inserting a digital command signal into the delay line 800 requesting the return of busy tone to the calling line circuit. The other two inputs of the gates 632 and 634 are connected to the third and fourth stages of the ring counter 840 in the supervisory control circuit 116. Thus, when the ring counter 840 advances to its third stepping position in the second portion of the assigned time slot, the gate 632 is fully enabled to forward a negative potential through the "OR" gate 636 to the input of the delay line 800. The storage of a negative-going pulse in the delay line in this time position represents the value "4." When the ring counter 840 advances to its fourth position, the enabling potential is removed from the gate 632 and the gate 634 is fully enabled to forward a negative potential through the "OR" gate 636 to the input of the delay line 800. The storage of a negative-going pulse in the fourth segment of the assigned time slot represents the valve "8." Thus, the designation "12" is now stored in the delay line 800 in binary coded form to represent the fact that the called line is busy, and the designation "1" representing the seized register 112 has been erased. The gate 663 removes the enabling signal from the gates 603, 632 and 634 at the end of the seized time slot.

After a ninety-five microsecond delay, the ring counter 840 is returned to its first position by the first synchronizing pulse in the first portion of the seized time slot, and the gate 841 is enabled. However, a negative-going pulse does not follow this first synchronizing pulse, and the flip-flop 851 in which a data bit representing the value "1" is stored is not operated. As the next four synchronizing pulses are applied to the ring counter 840, the gates 842–845 are enabled in sequence, and the negative-going pulses representing the values "4" and "8" set the flip-flops 853 and 854. The setting of these flip-flops controls the converter 860 to apply an enabling signal to one input of the amplifier 864 representing the command signal "12." Since the storage unit 850 no longer stores the command signal "1" representing the register 112, the amplifier 861 is not enabled. The ring counter 840 is then operated to the end of its cycle of operation and is returned to its first setting by the first synchronizing pulse in the second portion of the seized time slot.

This sets the flip-flop 858 so that a negative potential is applied to the common input of the amplifiers 861–866 and to one input of the gate 806. Since the amplifier 861 is not enabled, a negative-going pulse in the seized time slot is not supplied to the register 112. This releases the register 112 so that this register no longer supplies a negative-going pulse in the seized time slot to the gate 663. Thus, the inverter 804 remains nonconductive in the seized time slot, and the gate 806 is fully enabled to provide a negative potential to one input to each of the gates 811–815. This permits the digital command "12" to be returned to the input of the delay line 800 during the next cycle of the ring counter 840. The release of the register 112 also resets the flip-flop 600 so that the gates 603, 632 and 634 are disabled.

The negative potential provided by the flip-flop 858 completes the enabling of the amplifier 864 representing the digital command "12" so that this amplifier provides a negative-going pulse of five microseconds duration in the seized time slot. This negative-going pulse is applied to a release detector control circuit 222 and a tone gate 250. The tone gate 250 is connected between the common communication channel or highway 104 and a busy tone generator 252. The negative-going pulse opens the tone gate 250 so that busy tone is returned over the highway 104 and the line circuit 106 to the calling station 100 to advise the subscriber station that the call cannot be extended. The negative-going pulse applied to the release detector control circuit 222 is forwarded through an "OR" gate 224, an "AND" gate 226, and an "OR" gate 228 to be applied to the input of a delay line 230 having a delay interval of one hundred microseconds, i.e., the duration of a time frame.

Referring back to the supervisory control circuit 116, the ring counter 840 completes the cycle of operation during which the flip-flop 858 was set and enables the gates 811–815 in sequence so that the set flip-flops 853 and 854 control the gates 833, 822, 813 and 834, 824, 814 to apply the digital command "12" to the input of the delay line 800. At the end of this counting cycle of the ring counter 840 and when this counter is advanced to its first position by the first synchronizing pulse in the following time slot, the flip-flop 858 is restored to its reset condition so that the enabling potential is removed from the gates 811–815. The resetting of the flip-flop 858 also forwards a positive-going signal from the capacitor 872 through the diodes 874 and the emitter follower 876 to reset all of the flip-flops 851–855.

When the enabling potential is removed from the amplifier 864 by resetting the flip-flop 858, the negative-going pulse applied to the voice gate 250 is removed, and the busy tone generator 252 is disconnected from the highway 104. The trailing edge of the negative-going pulse provided at the output of the "AND" gate 226 sets a flip-flop 232 so that an inhibiting potential is now applied to one of the "AND" gate 226. This prevents the storage of more than one time slot signal in the delay line 230. The setting of the flip-flop 232 also controls a capacitor 236 to provide a negative-going signal that is applied to the input of a monostable multivibrator 234 through a diode 238. When the monostable multivibrator 234 is set, an inhibiting potential is applied to one input of each of a pair of "AND" gates 240 and 244. The setting of the flip-flop 232 also enables a lower input of an "AND" gate 242.

At the end of a one time frame delay and during the second half of the seized time slot, the negative-going signal previously applied to the input of the delay line 230 is applied to the "AND" gate 242 to complete the enabling thereof. This provides a negative-going signal that is returned to the input of the delay line 230 through the "OR" gate 228. The signal from the gate 242 is also applied to a tone gate 246 that is connected between a release detector 248 and the highway 104. The gate 246 connects the release detector 248 to the calling line circuit 106 over the highway 104 in the seized time slot. Since the delay line 800 in the supervisory control signal 116 continuously circulates the designation "12" in the seized time slot and since the delay line 230 continuously circulates a pulse in the seized time slot, the generator 252 applies busy tone to the calling line circuit 106 and the detector 248 looks for a release tone from this line circuit.

This operation continues until such time as the subscriber at the calling station 100 restores the calling line circuit 106 to a normal condition. In doing so, a release tone is applied to the highway 104 in the seized time slot and is forwarded through the tone gate 236 to the release detector 248. This release detector, which can comprise a detector of the type shown in the above identified Schmidt application, forwards a negative potential to the right-hand input of the "AND" gate 244 when a release tone is received from the calling line circuit 106. The monostable multivibrator 234 is set to have a delay interval longer than the time allotted for recognition of a release tone by the release detector 248. Thus, when the monostable multivibrator 234 restores to a normal condition, an enabling potential is applied to one of the inputs to the gate 240 and to two of the three inputs to the gate 244. At the end of the next following time frame, the gate 242 completes the enabling of the gate 240 in the seized time slot so that a more negative potential is applied to a reset lead of the flip-flop 234. The gate 244 is also fully enabled to apply a negative potential to the "OR" gates 440 and 442 in the calling time store 114.

The negative potential applied to the gate 400 renders the inverter 408 conductive so that the gate 404 is inhibited. By inhibiting the gate 404, the enabling potential for the gates 412–419 is removed so that the designation "150" of the calling line circuit 106 is erased from the delay line 400. The enabling potential forwarded through the gate 442 to one of the inputs of the gate 411 controls this gate to provide a negative-going pulse at the input of the delay line 400 in the first position of the first half of the time slot so that the time slot is now marked as idle.

The negative-going pulse at the output of the gate 244 is also applied through the "OR" gate 802 to render the inverter 804 conductive. This provides an inhibiting potential to one input of the "AND" gate 806 so that the gates 811–815 are inhibited. This erases the digital control signal "12" from the delay line 800 in the supervisory control circuit 116 and thus prevents the application of a negative-going pulse to the tone gate 250 and the "OR" gate 224. Accordingly, busy tone is now removed from the calling line circuit 106, and the designation of this line circuit is erased from the system.

At the end of the negative-going pulse provided at the output of the "AND" gate 242, the outputs of the gates 240 and 244 rise toward ground potential. The trailing edge of the pulse at the output of the gate 244 is returned to the release detector 248 to restore this detector to a normal condition. Similarly, the trailing edge of the negative-going pulse at the output of the gate 240 operates the flip-flop 232 to its reset condition. In this condition, the enabling potential is removed from one input to the "AND" gate 242, and an enabling potential is again applied to one input of the "AND" gate 226 so that the next time slot in the delay line 800 storing a demand for the circuit 222 can be transferred to the delay line 230. Since the enabling signal has been removed from the "AND" gate 242, the pulse in the previously seized time slot does not recirculate at the end of the next time frame. The system has now been restored to a normal condition.

It should be noted that in the event that a release tone is not received from the calling line circuit 106 by the release detector 248 prior to the time at which the monostable multivibrator 234 restores to its normal condition, the resetting of the multivibrator 234 merely serves to complete the enabling of the gate 240. Thus, when the trailing edge of the pulse in the seized time slot appears at the output of the gate 242, it is applied through the gate 240 to the flip-flop 232. This flip-flop is reset to inhibit the gate 242 and to partially enable the "AND" gate 226. The inhibiting of the "AND" gate 242 prevents recirculation of the pulse in the calling time slot at the end of the succeeding time frame, and the enabling of the gate 226 permits the next time slot in the delay line 800 storing a command requiring the use of the release detector 248 to be stored in the delay line 230. Accordingly, the system is not reset even though the pulse circulating in the calling time slot is removed from the delay line 230. If no other time slots require the use of the release detector 248, a pulse in the calling time slot will be inserted into the delay line 230 during the next time frame, and the release detector 248 is again associated with the calling time slot. However, if any succeeding time slot requires the use of the release detector 248, this succeeding time slot will be stored in the delay line 230 and the resultant setting of the flip-flop 232 will inhibit the input gate 226.

Accordingly, the command signal "12" can be circulated in as many of the time slots of the delay line 800 as necessary, and the busy tone generator 252 will be connected to all of the calling line circuits requiring busy tone in the proper time slots. However, only one time slot at a time can be circulated in the delay line 230 so that the release detector 248 is associated in sequence with each of the communication paths requiring this detector. Thus, the delay line 230 and the delay line 800 in the supervisory control circuit 116 provide means for connecting busy tone from the generator 252 to all of the communication paths to which busy tone should be connected and for connecting the release detector 248 to each of these time slots in sequence for a predetermined period of time.

Returning now to the operation of the route selector 120 and assuming that the called line designation stored in the register 112 is not identical to a designation stored in any time slot in either the calling line store 114 or the called line store 115, the "OR" gate 530 and the corresponding "OR" gate in the called circuit busy test circuit 540 do not provide a negative potential to either of the inputs of the "OR" gate 534. Thus, the inverter 542 is not rendered conductive during any of the successive time slots in which the busy test is made. The negative-going pulses provided by the clock pulse source are now effective through the "AND" gate 536 to render the inverter 538 conductive during the second half of each time slot. When the inverter 538 is rendered conductive, the "AND" gate 544 is inhibited so that the inverter 546 cannot set the busy flip-flop 600. The positive-going pulse provided at the output of the inverter 538 for each time slot in which a busy condition is not detected is applied to the input stage 551 of the time slot counter 550 so that the flip-flops 551, 552, 554 and 558 representing the values "1," "2," "4" and "8," respectively, are operated step-by-step. When these flip-flops are advanced to a setting representing ten time slots, the flip-flops 552 and 558 are in a set condition and the flip-flops 551 and 554 are in a reset condition.

The outputs of these flip-flops are connected to an "AND" gate 560 so that this "AND" gate is fully enabled when the time slot counter 550 reaches a setting representing a count of "10." When the gate 560 is fully enabled, a negative-going pulse is applied to an inverter 562 so that this inverter is rendered conductive to set an idle flip-flop 564. When the flip-flop 564 is set, an enabling potential is applied to the plurality of gates 511–518 through which the called line designation stored in the register 112 is transferred to the called line store 115 and also to a plurality of gates 601, 622, 624 and 626.

As indicated above, one of the inputs to each of the gates 511–518 is connected to the register 112 over the cable 604, and these conductors are provided with a pattern of ground and negative potentials in which the presence of a negative potential represents one of the values "1," "2," "4," "8," "16," "32," "64" and "128," respectively. Another input of each of the gates 511–518 is provided with a negative enabling potential from the set idle flip-flop 564. A third input of all of the gates 511–518 is connected to the gate 663 to be supplied with a negative-going pulse of five microseconds duration in the assigned time slot. The remaining input of each of the gates 511–518 is connected to the output of the ring counter in the called line store 115 corresponding to the counter 410 in the calling line store 114. Accordingly, the gates 511–518 are enabled in sequence to provide a pattern of ground and negative-going pulses through an "OR" gate 506 to the input of the delay line in the called time store 115 corresponding to the delay line 400 in the calling time store 114. The trailing edge of the first negative-going pulse provided at the output of the "OR" gate 506 sets a flip-flop 500.

Thus, the designation of the called line is stored in the called line store 115 by the route selector 120 as soon as the called line is found to be in an idle condition. This designation is circulated in the called line store 115 in the same manner as in the calling line store 114 so that a negative-going pulse in the assigned time position is supplied to the two called circuit gates associated with the calling line circuit. Assuming that the line circuit 102 is the called circuit, the called line store 115 provides a negative-going pulse in the assigned time position to the gates 330 and 334 so that the subscriber transmitter 348 and the subscriber receiver 350 are connected to the highway 104 in the same time position or slot in which the subscriber transmitter 200 and the subscriber receiver 202 in the calling station 100 are connected.

The negative potential supplied from the flip-flop 564 to one input of the "AND" gate 601 partially enables this gate so that when the negative-going pulse in the second portion of the calling time slot is provided by the gate 663, a negative potential is again forwarded through the "OR" gate 802 to render the inverter 804 conductive. When the inverter 804 is rendered conductive, the gates 811–815 are inhibited so that the designation "1" of the register 112 is erased from the delay line 800. This ultimately releases this register in the manner described above.

The negative potential provided at the output of the flip-flop 564 is also supplied to one input of each of the gates 622, 624 and 626, which gates form a control means 620 for storing a digital command "11" in the delay line 800 representing a ringing operation. Another input on each of the gates 622, 624 and 626 is connected to the gate 663 to receive a five microsecond, negative-going pulse in the second portion of the assigned time slot. The remaining inputs of the gates 622, 624 and 626 are connected to the first, second and fourth counting stages, respectively, of the ring counter 840 in the supervisory control circuit 116. Accordingly, during the succeeding cycle of operation of this ring counter, the gates 622, 624 and 626 are enabled in sequence to forward negative-going pulses through an "OR" gate 628 to the input of the delay line 800. A negative-going pulse is now stored in the first, second and fourth portions of the first half of the time slot representing the values "1," "2" and "8" forming a ringing command signal or designation "11." At the end of the time slot, the negative-going signal is removed from the gate 663 by the register 112 so that the gates 511–518, 601, 622, 624 and 626 are disabled and so that the inverter 804 is rendered nonconductive. The release of the inverter 804 removes the inhibiting potential from the gates 811–815 to permit the circulation of signals in subsequent time slots.

The trailing edge of the negative-going pulse provided by the gate 663 resets the flip-flop 500 so that a capacitor 502 forwards a positive-going pulse through a diode 504 and an emitter follower 532 to the reset terminals of the flip-flops 551, 552, 554 and 558. This resets the time slot counter 550 in the route selector 120 to a normal condition. Further, this positive-going pulse is applied to the reset terminal of the idle flip-flop 564 so that this flip-flop is operated to its reset condition. In this condition, the flip-flop 564 removes one of the enabling potentials from the gates 511–518, 601, 622, 624 and 626.

At the end of the ninety-five second delay interval, the ring counter 840 renders the gates 841–845 responsive in sequence to negative-going signals provided at the output of the delay line 800 so that the flip-flops 851, 852 and 854 are set. These signals forward enabling potentials through the gates 831, 832, 820, 834 and 824 to the gates 811, 812 and 814 to condition the designation "11" for recirculation through the delay line 800. The output potentials from the flip-flops 851–855 are also applied to the converter 860 so that the uppermost amplifier 861 is no longer enabled and one input lead to the amplifier 863 is enabled. When the flip-flop 858 is set at the end of the first portion of the assigned time slot, an enabling potential is applied to the gates 811–815 to permit the command "11" to be stored and recirculated in binary form through the delay line 800. In addition, an enabling potential is applied to the other input of the amplifier 863 so that a five microsecond, negative-going pulse is supplied to an "OR" gate 254, a tone gate 326, and one input of an "AND" gate 302 in a ring trip detector control circuit 300. The negative signal applied to the input of the tone gate 326 connects a ring tone generator 328 to the highway 104 in the assigned time position so that ring tone is now applied to the called line circuit 108 in the assigned time slot.

The negative-going signal applied to one input of the "OR" gate 254 is forwarded through the "OR" gate 224, the "AND" gate 226, and the "OR" gate 228 be applied to the input of the delay line 230 in the control circuit 222 for the release detector 248. This pulse in the assigned time slot now circulates in the delay line 230 through the gates 242 and 228 in the manner described above so that the release detector 248 is connected to the highway 104 through the tone gate 246 in the assigned time position. This provides a means for releasing the system in the event the called station does not answer and the call is released by the calling station 100 during the application of ringing to the called line circuit 108. The negative potential provided at the output of the gate 244 under the control of the release detector 248 if the call is abandoned by the calling subscriber resets the system in the manner described above. However, the negative-going signal provided at the output of the gate 244 is also applied to the called line store 115 to erase the called line designation from this store in the same manner as in the calling line store 114.

The negative-going signal applied to the input of the "AND" gate 302 operates the control circuit 300 so that a ring trip detector 324 is connected to the highway 104 in the assigned time slot through a tone gate 322 to provide a means for detecting answering of the call at the called station 102. The control circuit 300 is identical in operation to the control circuit 222 for the release detector 248. The negative-going signal provided at the output of the gate 302 is forwarded through an "OR" gate 304 to be circulated through a delay line 306 having a delay interval of one hundred microseconds.

When the ring counter 840 in the supervisory control circuit 116 reaches the end of the cycle of operation at the end of the assigned time slot, the flip-flop 858 is reset to its normal condition to terminate the application of the negative-going pulse to the gates 254, 302 and 326. The removal of the pulse from the voice gate 326 disconnects the ring tone generator 328 from the highway 104. The removal of the negative-going pulse from the "OR" gate 254 sets flip-flop 232 in the control circuit 222 in the manner described above. The removal of the negative-going pulse from the "AND" gate 302 sets a flip-flop 308 in the control circuit 300 so that the gate 302 is inhibited and a gate 320 is enabled to permit circulation of a negative-going pulse in the assigned time slot through the gates 320 and 304 and the delay line 306. The output of the gate 320 is also applied to a tone gate 322 to connect a ring trip detector 324 to the highway 104 in the calling time slot once during each time frame. The setting of the flip-flop 308 also controls a capacitor 314 so that negative-going pulse is applied through a diode 312 to set a monostable multivibrator 310. The setting of this multivibrator 310 inhibits a pair of gates 316 and 318.

If the call is released from the calling station 100 before the receipt of a ring trip signal from the called station 102, the release detector 248 operates to restore the system in a manner described above, except that the inhibiting signal provided by the gate 802 and the inverter 804 erases the control command "11" from the delay line 800 rather than the control command "13." However, if a ring trip signal is received from the called station 102 indicating that the call has been answered at the line circuit 108, the ring trip detector 324 completes enabling of the gate 318 in the same manner that the control circuit 222 completes the enabling of the gate 244 so that a negative-going signal is provided at the output of the gate 318 during the time slot in which ring tone is being applied to the called station 102. This negative-going signal is forwarded through the "OR" gates 820, 822 and 824 to the gates 812–814 and is also applied to the input of an inverter 836 so that the gates 831–835 are inhibited. Therefore, during the following cycle of operation of the ring counter 840 in the supervisory control circuit 116, the ringing control command "11" is erased from the delay line 500, and negative-going pulses from the enabled gates 812, 813 and 814 are forwarded through the "OR" gate 808 and applied to the input of the delay line 800 in the second, third and fourth positions of the first portion of the time slot representing the values "2," "4" and "8." Thus, a release command signal "14" is now stored in the delay line 800.

At the end of the negative-going pulse from the output of the gate 318 at the end of the time slot, the control circuit 300 and the ring trip detector 324 are reset to a normal condition, the enabling potential is removed from the gates 828, 822 and 824, and the inverter 836 is rendered nonconductive to permit the flip-flops 851–855 to control the storage of signals in the delay line 800 during the next cycle of operation of the ring counter 840.

At the end of a ninety-five microsecond delay, the ring counter 840 begins a cycle of operation and enables the gates 841–845 in sequence so that the flip-flops 852, 853 and 854 are set by the negative-going pulses from the delay line 800 representing the control command "14." The output signals from the flip-flops 851–855 are applied to the gates 811–815 and the input of the converter 860. This converter enables one of the input leads to the amplifier 866 so that when the flip-flop 853 is next operated, the amplifier 866 is fully enabled to forward a negative-going pulse through the "OR" gate 254 to the "OR" gate 222. This causes a pulse in the assigned time slot to again be circulated through the delay line 230 so that the tone gate 246 connects the release detector 248 to the established communication path on the highway 104. The control command "14" continues to recirculate through the delay line 800 and the storage unit 850 in the supervisory control circuit 116, and a pulse circulates in the delay line 230 in the assigned time slot and during time spaced intervals so that the release detector 248 monitors the highway 104 in the time position assigned to the communication path for the presence of a release tone. This operation continues until such time as one or both of the subscribers at the stations 100 and 102 releases the connection to cause a release tone to be applied to the channel 104.

At this time, the release detector 248 operates in the manner described above to provide a negative-going pulse at the output of the gate 244 in the assigned time position. This negative pulse clears the calling line store 114 and inserts an idle mark in the first portion thereof to mark the time slot as being idle. This negative-going pulse also clears the called line store 115 and is effective through the "OR" gate 802 and the inverter 804 to clear the delay line 800 in the supervisory circuit 116 in the assigned time slot. The system is now restored to a normal condition.

As indicated above, a time slot remains circulating in the delay line 230 in the control circuit 222 for the release detector 248 only for a predetermined period of time. Thus, the control command "14" can be circulating in more than one of the time slots in the delay line 800. A negative-going pulse in each of these time slots requiring the detector 248 is stored in sequence in the delay line 230 so that the release detector 248 monitors the highway 104 in each of the necessary time slots in sequence. In this manner, a single release detector 248 can be used to detect the release of a connection established over the highway 104 in any of the time slots.

The route selector 120 also includes means for signaling an operator position 880 (FIG. 8) in the event that the number received by the seized register 112 from the calling line circuit 106 represents a call to be extended to an operator. When the register 112 receives a transmitted designation indicating that the communication path is to be extended to the operation position 880, this register forwards a negative-going pulse in the assigned time slot over a conductor in the cable 606 to one input of the "OR" gate 802 so that the delay line 800 in the supervisory control circuit 116 is cleared of information previously stored in the assigned time slot. The gate 802 renders the inverter 804 conductive so that the gate 806 inhibits the gates 811–815 to erase any information previously stored in the time slot assigned to the register 112. Normally, only the designation "1" of the register 112 is stored in the delay line 800 at this time.

The register 112 also includes means for operating a control means 610 to insert an operator command "13" into the delay line in place of the erased information. The control means 610 includes three gates 612, 614 and 616 that are supplied with a negative potential by the register 112 when the call is to be directed to an operator. The register 112 does not apply called circuit representing signals to the conductor of the cable 604 at this time. The gates 612, 614 and 616 are further enabled by the negative-going pulse supplied by the gate 663 in the seized time slot and are operated in sequence under the control of the counting ring 840 in the supervisory control circuit 116. The gates 612, 614 and 616 are connected to the first, third and fourth stages of this counter so that negative-going pulses are forwarded through an "OR" gate 618 to the input of the delay line 800 representing the values "1," "4" and "8."

This signal is stored in and circulated through the delay line 800 and the unit 850 in the manner described above so that once during each cycle of operation the flip-flops 851, 852 and 854 are set. The output of these flip-flops enables the gates 811, 812 and 814 so that the signal is continuously circulated through the delay line 800. In addition, the output potentials from the flip-flops 851–855 control the converter 860 so that one lead of the amplifier 865 is enabled. Thus, when the flip-flop 853 is set, the amplifier 865 is fully enabled to supply a negative-going signal to the operator position 880. This advises the operator that the call is awaiting attention. The system can be restored to a normal condition under the control of the operator by applying a negative signal to the reset conductor connected to the output of the gate 244.

In order to reset the system to a normal condition in the event that some difficulty is encountered in establishing a connection, the registers, such as the register 112, include means for storing the digital command "12" in the delay line 800 in the supervisory control circuit 116. More specifically, when a difficulty is encountered, the register 112 forwards a negative potential through the "OR" gate 602 to the input of the gates 603, 632 and 634. When the gate 603 is fully enabled by the negative-going pulse provided by the gate 663 in the calling time slot, the "OR" gate 802 and the inverter 804 again inhibit the gates 811–815 so that any command signal now stored in the delay line 800 is erased.

The gates 632 and 634 in the busy control means 630 are also enabled in the calling time slot by the gate 663 and in sequence by the ring counter 840 so that the input of the delay line 800 receives negative-going signals from the "OR" gate 636 in the third and fourth positions of the first half of the calling time slot representing the values "4" and "8" or "12." This signal now circulates through the delay line 800 and the storage unit 850 in the manner described above so that busy tone is forwarded from the generator 252 to the calling circuit. In addition, the release detector 248 is connected to the highway 104 in the assigned time slot to search for the presence of a release tone indicating that the connection has been terminated.

Although the present invention has been described with reference to one illustrative embodiment thereof, it should be understood that many other modifications and embodiments can be devised by those skilled in the art that will fall within the spirit and scope of the principles of this invention.

What is claimed and desired to be secured by Letters Patent of the United States is:

In a time division multiplex system wherein each of a given plurality of successive time intervals is divided into an even predetermined number of successive sub-intervals and each of said sub-intervals consists of first and second successive portions, delay means having an input and an output for reproducing at its output a signal applied to its input after a given time delay at least equal to the sum of said plurality of time intervals minus one-half of a time interval, means for applying a synchronizing pulse having only one polarity with respect to a given reference level to the input of said delay means during solely each and every first portion of each sub-interval of each of said plurality of successive time intervals and for applying an information pulse having only a polarity opposite to that of said synchronizing pulse with respect to said reference level to solely each of preselected ones of said second portion of the first-occurring one-half of the sub-intervals of each of said plurality of time intervals, a cyclic steering counter having a count capacity equal to one-half said predetermined number coupled to the output of said delay means and responsive to pulses having solely said one polarity for counting said synchronizing pulses, a first switch having a set condition and a reset condition coupled to said counter for setting said first switch at the termination of each odd cycle of said counter and resetting said first switch at the end of each even cycle of said counter, a group of bistable second switches each corresponding to a different count of said counter coupled to the output of said delay means and said counter to effect the setting of only that second switch corresponding to the count then manifested by said counter to a set condition only in response to the presence of an information pulse at the output of said delay means, utilization means coupled to said first switch and said group of second switches for producing an output in accordance with the binary value manifested by the settings of said group of second switches only in response to said first switch being in a set condition, recirculating means including clock means coupling said counter, said first switch and said groups of second switches to the input of said delay means for reapplying an information pulse only during the second portion of a sub-interval and only in response to said first switch being in a set condition and that second switch corresponding to the count then manifested by said counter being in a set condition, and means for effecting the resetting of all of said second switches in response to the resetting of said first switch.

References Cited in the file of this patent
UNITED STATES PATENTS

| | | |
|---|---|---|
| 2,917,583 | Burton et al. | Dec. 15, 1959 |
| 2,935,569 | Saal et al. | May 3, 1960 |
| 2,984,705 | Harris | May 16, 1961 |
| 3,015,699 | Faulkner et al. | Jan. 2, 1962 |
| 3,049,593 | Touraton et al. | Aug. 14, 1962 |